United States Patent
Fischer et al.

(10) Patent No.: US 10,249,219 B2
(45) Date of Patent: Apr. 2, 2019

(54) CHIP AND METHOD FOR OPERATING A PROCESSING CIRCUIT

(71) Applicant: Infineon Technologies AG, Neubiberg (DE)

(72) Inventors: Wieland Fischer, Munich (DE); Thomas Kuenemund, Munich (DE); Bernd Meyer, Munich (DE)

(73) Assignee: Infineon Technologies AG, Neubiberg (DE)

( * ) Notice: Subject to any disclaimer, the term of this patent is extended or adjusted under 35 U.S.C. 154(b) by 258 days.

(21) Appl. No.: 14/882,542

(22) Filed: Oct. 14, 2015

(65) Prior Publication Data
US 2016/0105281 A1   Apr. 14, 2016

(30) Foreign Application Priority Data

Oct. 14, 2014 (DE) .................. 10 2014 114 898
May 13, 2015 (DE) .................. 10 2015 107 509

(51) Int. Cl.
*G09C 1/00* (2006.01)

(52) U.S. Cl.
CPC .......... *G09C 1/00* (2013.01); *H04L 2209/122* (2013.01)

(58) Field of Classification Search
CPC ...................... G09C 1/00; H04L 2209/122
See application file for complete search history.

(56) References Cited

U.S. PATENT DOCUMENTS

| | | | |
|---|---|---|---|
| 4,597,083 A * | 6/1986 | Stenerson | H03M 13/15 714/753 |
| 5,440,553 A * | 8/1995 | Widjaja | H04L 49/1507 370/411 |
| 7,487,198 B2 | 2/2009 | Hatsch et al. | |
| 7,716,270 B2 | 5/2010 | Hatsch et al. | |
| 9,753,691 B2 * | 9/2017 | Abdallah | G06F 9/3017 |
| 2002/0040379 A1 | 4/2002 | Amer | |
| 2002/0049582 A1 * | 4/2002 | Baumgartner | G10L 15/285 704/201 |
| 2003/0118054 A1 * | 6/2003 | Zhu | H04L 45/00 370/474 |
| 2004/0125103 A1 * | 7/2004 | Kaufman | G06T 15/06 345/419 |

(Continued)

FOREIGN PATENT DOCUMENTS

| | | |
|---|---|---|
| DE | 10347077 A1 | 5/2005 |
| DE | 102005011666 B3 | 6/2006 |

OTHER PUBLICATIONS

Rabaey et al., "Digital Integrated Circuits: A Design Perspective", 2003, pp. 565, 567 and 568, Prentice Hall.

*Primary Examiner* — Techane Gergiso
(74) *Attorney, Agent, or Firm* — Viering, Jentschura & Partner mbB

(57) ABSTRACT

According to one embodiment, a processing circuit is described including a first input path and a second input path, a processing element configured to receive a first input bit and a second input bit via the first input path and the second input path and configured to perform a logic operation which is commutative with respect to the first input bit and the second input bit and a sorter configured to distribute the first input bit and the second input bit to the first input path and the second input path according to a predetermined sorting rule.

18 Claims, 20 Drawing Sheets

(56) References Cited

U.S. PATENT DOCUMENTS

| | | | | |
|---|---|---|---|---|
| 2005/0114424 | A1* | 5/2005 | Hatsch | G06F 7/607 |
| | | | | 708/700 |
| 2005/0125637 | A1* | 6/2005 | Dijkstra | G06F 9/30025 |
| | | | | 712/221 |
| 2005/0198473 | A1* | 9/2005 | Ford | G06F 7/76 |
| | | | | 712/221 |
| 2006/0235923 | A1* | 10/2006 | Hatsch | G06F 7/503 |
| | | | | 708/707 |
| 2007/0113046 | A1* | 5/2007 | Vorbach | G06F 15/7867 |
| | | | | 712/15 |
| 2008/0072129 | A1* | 3/2008 | Yamanaka | H03M 13/3961 |
| | | | | 714/796 |
| 2008/0077771 | A1* | 3/2008 | Guttag | G06F 7/53 |
| | | | | 712/204 |
| 2008/0285671 | A1* | 11/2008 | Sundberg | H03M 13/3905 |
| | | | | 375/260 |
| 2015/0304219 | A1* | 10/2015 | van Bemmel | H04L 45/7453 |
| | | | | 370/392 |

* cited by examiner

CHIP AND METHOD FOR OPERATING A PROCESSING CIRCUIT

CROSS-REFERENCE TO RELATED APPLICATION

This application claims priority to German Patent Application Serial No. 10 2014 114 898.3, which was filed Oct. 14, 2014, and is incorporated herein by reference in its entirety. This application further claims priority to German Patent Application Serial No. 10 2015 107 509.1, which was filed May 13, 2015, and is incorporated herein by reference in its entirety.

TECHNICAL FIELD

The present disclosure relates to chips and to methods for operating a processing circuit.

BACKGROUND

In processing circuits as are for example included in chip cards, such as processing circuits for carrying out cryptographic operations, a low power consumption is a typical requirement. Accordingly, approaches for designing and operating processing circuits to allow logic operations such as cryptographic operations to be carried out with reduced power consumption are desirable.

SUMMARY

According to one embodiment, a processing circuit is provided including a first input path and a second input path, a processing element configured to receive a first input bit and a second input bit via the first input path and the second input path and configured to perform a logic operation which is commutative with respect to the first input bit and the second input bit, and a sorter configured to distribute the first input bit and the second input bit to the first input path and the second input path according to a predetermined sorting rule.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
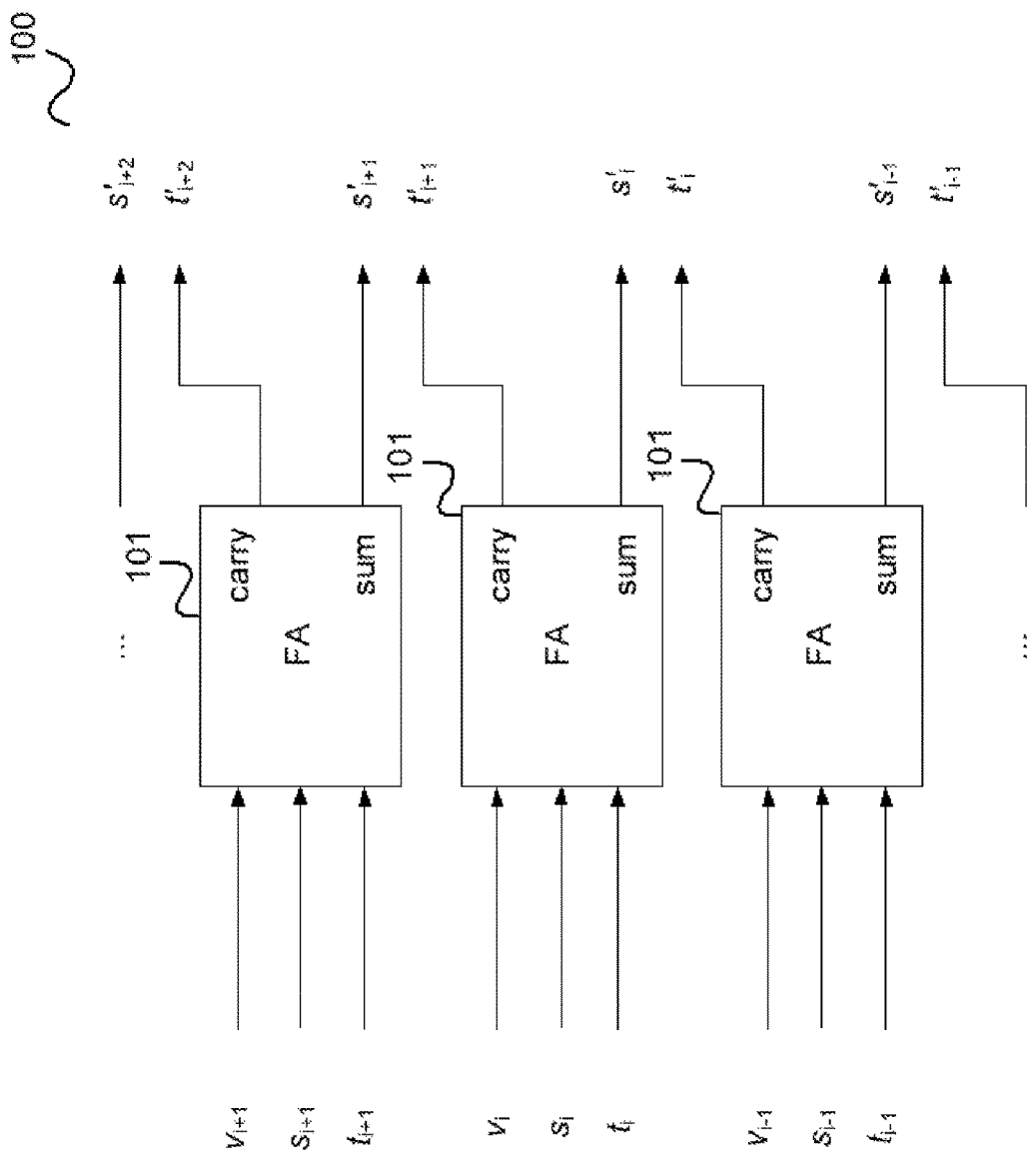
FIG. 1 shows an arrangement for adding a number s and a number z in a redundant representation.

The following detailed description refers to the accompanying drawings that show, by way of illustration, specific details and embodiments in which the invention may be practiced. Other aspects may be utilized and structural, logical or electrical changes may be made without departing from the scope of the invention. The various aspects of this disclosure are not necessarily mutually exclusive, as some aspects of this disclosure can be combined with one or more other aspects of this disclosure to form new aspects.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

An adder for long numbers with a length of several hundred bits is typically a central component of algorithmic logic units (ALUs, for arithmetic logic units) and co-processors for acceleration of asymmetric cryptographic methods such as for example RSA, ElGamal, Diffie-Hellman and DSA, in particular their variants based on elliptic curves. Corresponding circuit arrangements typically form the basis for further arithmetic operations on long numbers like for example multiplications and can typically only be realized with a relatively high level of effort. On the other hand, they are typically indispensable for achieving sufficient performance of the cryptographic methods like public key encryption and decryption or the generation and checking of electronic signatures in security tokens, for example for chip cards.

When implementing an adder for long numbers there is the issue that carry bits which arise from the adding of two single bits can propagate over the whole length of the numbers. This leads to logical dependencies which in turn prompt, in a simple implementation, the depth of the resulting circuit in terms of logic gates with a limited number of inputs to increase logarithmically with the length of the numbers to be added. However, the depth of the circuit is responsible for the performance and the power consumption: in a circuit with high depth, more time is necessary for calculating the result, and, during the calculation, internal signals can change their values more frequently due to transient transitions (glitches) leading to a higher power consumption.

This issue may be addressed by using redundant numerical representations of the operands to be added. In this approach, each number can have a plurality of representations and an adding operation provides not the addition result in its final form but one of the representations of the result. Such an approach can for example be used for the representation of intermediate results during a multiplication. Since the additions are not carried out completely in such an approach, it is possible to break through the carry path and to implement such adders with a depth of only a few gates. The resulting adders typically have a constant execution time which in particular does not depend on the length of the operands to be added. However, this approach requires that a higher number of memory cells are provided for storing the redundantly represented numbers and that a final addition is carried out for adding the components of the redundant numerical representation in order to generate the result in the usual numerical representation.

Examples of redundant numerical representations are the carry-save representation, which may for example be used for the implementation of a Wallace-Tree multiplier, or the signed-digit representation of the Avizienis multiplier. In systolic array multipliers another approach is used: the additions of long numbers to be carried out are pulled apart in time to achieve constant gate depths in the circuit parts between memory elements. This, however, typically leads to an increased runtime.

A redundantly represented n-bit number $z=(z_{n-1}, \ldots, z_0)$ in carry-save representations includes two bit sequences (s, t) with $s=(s_{n-1}, \ldots, s_0)$ and $t=(t_{n-1}, \ldots, t_0)$, wherein the invariant $z=s+t$ holds in terms of the integer addition of numbers in binary representations. To add a further binary number $v=(v_{n-1}, \ldots, v_0)$ to the number z in the representation (s, t), an arrangement of full adders (FA) is used as illustrated in FIG. 1.

FIG. 1 shows an arrangement 100 for adding a number s and a number z in redundant representation (s, t), with $z=s+t$.

The arrangement 100 includes a plurality of full adders 101, wherein the ith full adder (where i extends from one to the number of adders) reduces (by adding) three bits $s_i$, $t_i$, und $v_i$ to a (new) sum bit $s'_i$ und a carry bit $t'_{i+1}$, such that the result $z'=z+v$ is given in redundant representation (s', t').

In the following, an approach is described which for example allows, in a carry save adder, as illustrated in FIG. 1, a redundant numerical representation to be changed in order to reduce the number of state transitions in an addition of (e.g. long) numbers and thus achieve a reduced power consumption. For example, in a random distribution of numbers to be added (which can be assumed for a lot of cryptographic methods), the number of state transitions (e.g. of memory cells in which the result of the current addition is stored) when successively adding numbers can on average be reduced by 25%. This allows an average reduction in the current consumption of a carry save adder by 15%-20%.

Figure 2:
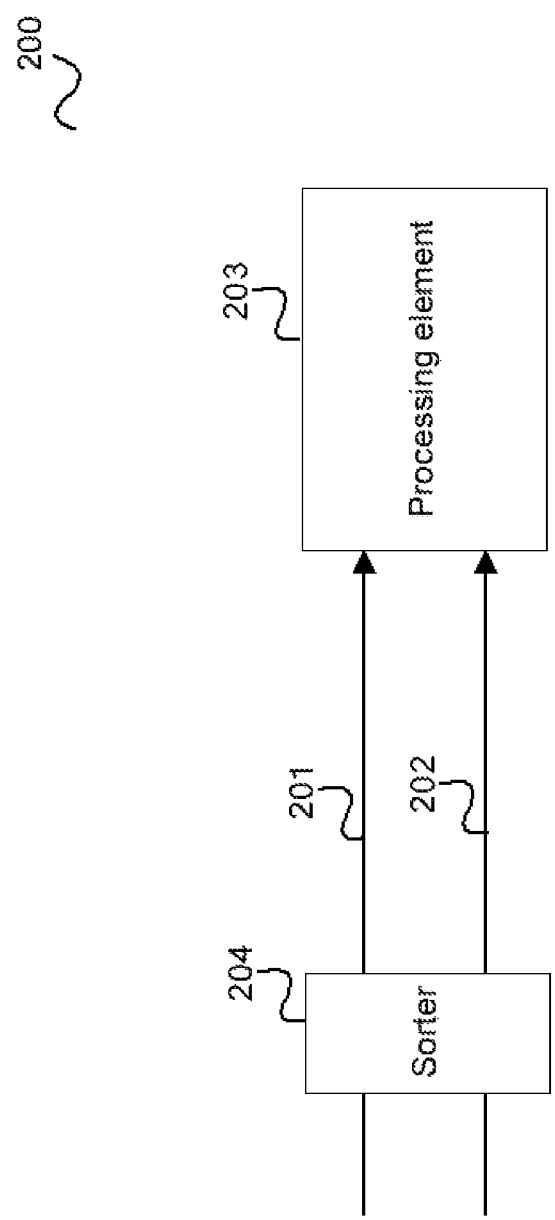
FIG. 2 shows a processing circuit according to an embodiment.

FIG. 2 shows a processing circuit 200 according to an embodiment.

The processing circuit 200 includes a first input path 201, a second input path 202 and a processing element 203, which is configured to receive a first input bit and a second input bit via the first input path 201 and the second input path 202 and configured to perform a logic operation which is commutative with respect to the first input bit and the second input bit.

The processing circuit 200 further includes a sorter 204 configured to distribute the bits on the paths according to a predetermined sorting rule.

According to one embodiment, in other words, input bits whose distribution to input paths of a processing circuit is irrelevant for an operation carried out by the circuit (such as the distribution of the input operands of an adder) are distributed to the input paths according to a predetermined rule such that the number of state transitions of the input paths (and e.g. memory cells such as flip-flops included in the input paths) is reduced.

The first and second input bits may be part of input data (e.g. input words). For example, the first input bit is part of a first input word and the second input bit is part of a second input word and the sorter distributes the input words (and hence the input bits) according to the sorting rule.

The logic operation which is commutative with respect to the first input bit and the second input bit may for example mean that it is irrelevant for the result of the operation whether the processing element receives the first input bit via the first input path and the second input bit via the second input path or the first input bit via the second input path and the second input bit via the first input path.

A basic idea of one embodiment can be seen in the use of the degrees of freedom of a redundant representation of a state of a circuit (e.g. an addition result) in order to reduce, by changing a specific representation of a calculated state of the circuit, the number of signal transitions on average. Although this may involve a change in the circuit which increases the number of required gates, a reduction in the average power consumption of the overall circuit can be achieved because of the reduction in the signal transitions and through prevention of the occurrence of glitch waves from signal transitions.

According to one embodiment, the sorter is configured to receive the first input bit and the second input bit and to supply the first input bit and the second input bit to the first input path and the second input path according to the predetermined sorting rule.

The predetermined sorting rule is for example to distribute a "1" to the first input path and a "0" to the second input path if the first input bit is different from the second input bit.

Alternatively, the predetermined sorting rule is for example to distribute a "0" to the first input path and a "1" to the second input path if the first input bit is different from the second input bit.

The logic operation for example includes an addition of the first input bit and the second input bit.

According to one embodiment, the processing element is configured to receive the first input bit and the second input bit for an iteration of the logic operation and the first input bit and the second input bits are output bits from an earlier iteration of the logic operation.

The first input bit and the second input bit are for example bits for one digit of a redundant representation of a binary number.

The processing element is for example configured to receive the first input bit and the second input bit for an application of the logic operation to a digit of the binary number and the first input bit is for example the result bit of an application of the logic operation to the same or a different digit of the binary number and the second input bit is for example the result bit of an application of the logic operation to the same or a different digit of the binary number.

For example, the first input bit or the second input bit is a carry bit of an addition applied to a different digit of the binary number.

The logic operation may for example include an addition of the first input bit and the second input bit and a bit of another binary number.

According to one embodiment, the first input bit and the second input bit are bits for one digit of a carry save representation of a binary number.

According to one embodiment, the first input path includes a first memory element for storing the first input bit and the second input path includes a second memory element for storing the second input bit.

For example, the first memory element is a first flip-flop and the second memory element is a second flip-flop.

According to one embodiment, the processing element is simplified on the basis of the first input bit and the second input bit being distributed to the first input path and the second input path according to the predetermined sorting rule.

By way of example, the processing element is simplified such that it carries out the logic operation erroneously when the first input bit and the second input bit are not distributed to the first input path and the second input path according to the predetermined sorting rule.

According to one embodiment, the processing element is set up to carry out the logic operation according to a truth table that, allowing for the first input bit and the second input bit being distributed to the first input path and the second input path according to the predetermined sorting rule, is simplified such that the processing element carries out the logic operation erroneously when the first input bit and the second input bit are not distributed to the first input path and the second input path according to the predetermined sorting rule.

By way of example, the processing circuit is a reduced full adder circuit.

For example, the processing circuit is a reduced mirror adder circuit.

Figure 3:
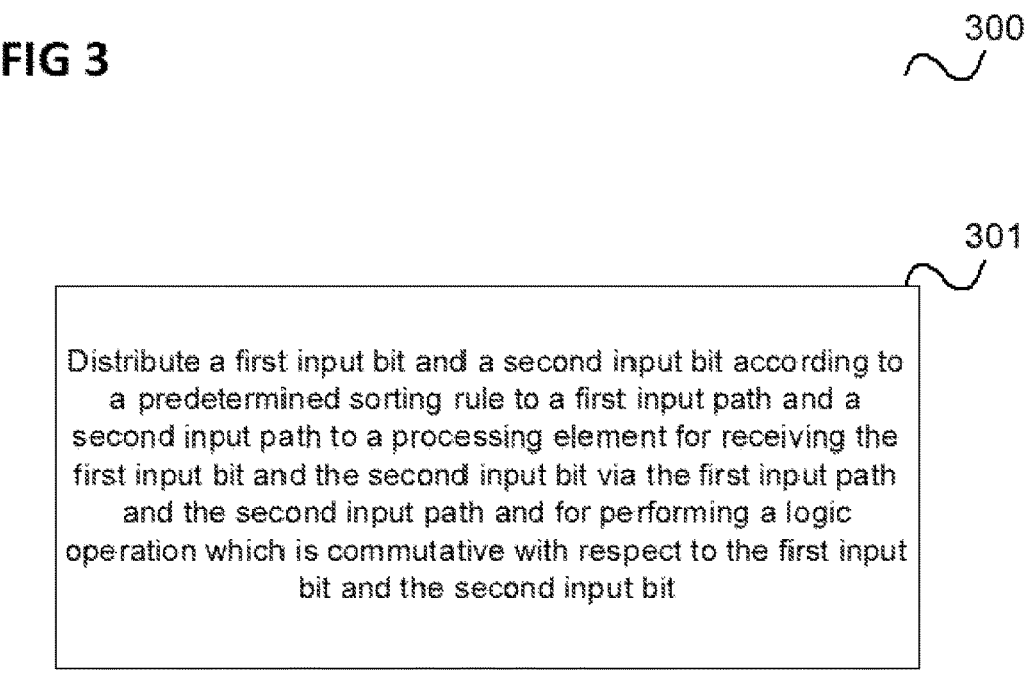
FIG. 3 shows a flow chart illustrating a method for distributing bits to input paths of a processing circuit.

According to one embodiment, a method as illustrated in FIG. 3 is carried out.

FIG. 3 shows a flow chart 300 illustrating a method for operating a processing circuit.

The method includes, at 301, distributing a first input bit and a second input bit according to a predetermined sorting rule to a first input path and a second input path to a processing element for receiving the first input bit and the second input bit via the first input path and the second input path and for performing a logic operation which is commutative with respect to the first input bit and the second input bit.

It should be noted that embodiments described in context with the chip 200 are analogously valid for the method illustrated in FIG. 3 and vice versa.

In the following, embodiments are described in more detail.

According to one embodiment, for example, the result bits $s'_i$ and $t'_i$ of the arrangement 100 shown in FIG. 1 are sorted before they are stored and possibly returned to the FAs 101 for the next addition. As a result of the sorting, some of the redundant representations of the addition result, as can occur in the memory cells and for the next input, are effectively removed. Thus, the bits of the results of an addition (after sorting) $s'_i$ have a better opportunity to be equal to the bits of the input $s_i$. The same holds for the bits $t'_i$ and $t_i$. The sorting in the context of the carry save adder of FIG. 1 is illustrated in FIG. 4.

Figure 4:
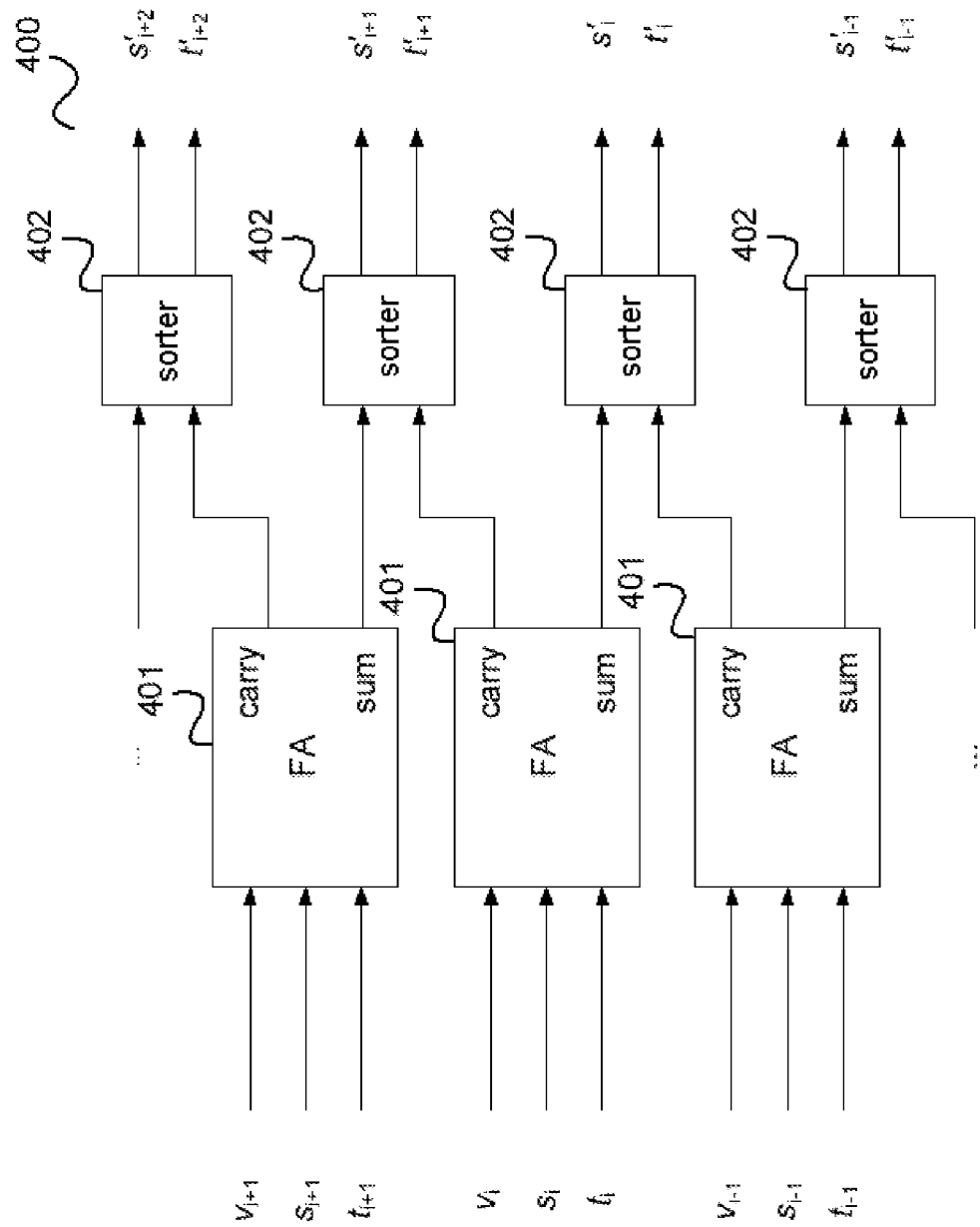
FIG. 4 shows a processing arrangement according to an embodiment.

FIG. 4 shows a processing arrangement 400 according to an embodiment.

The processing arrangement 400 includes a plurality of full adders (FAs) 401 similar to the full adders 101, wherein the ith full adder adds the bits $v_i$, $s_i$ and $t_i$ and outputs the carry bit and the sum bit of this addition. Further, the processing arrangement 400 includes a plurality of sorters 402. The sum bit of the ith FA is input together with the carry bit of the i−1th FA into a sorter 402 which outputs the result bits $s'_i$ and $t'_i$ which are sorted according to a predetermined rule.

Figure 5:
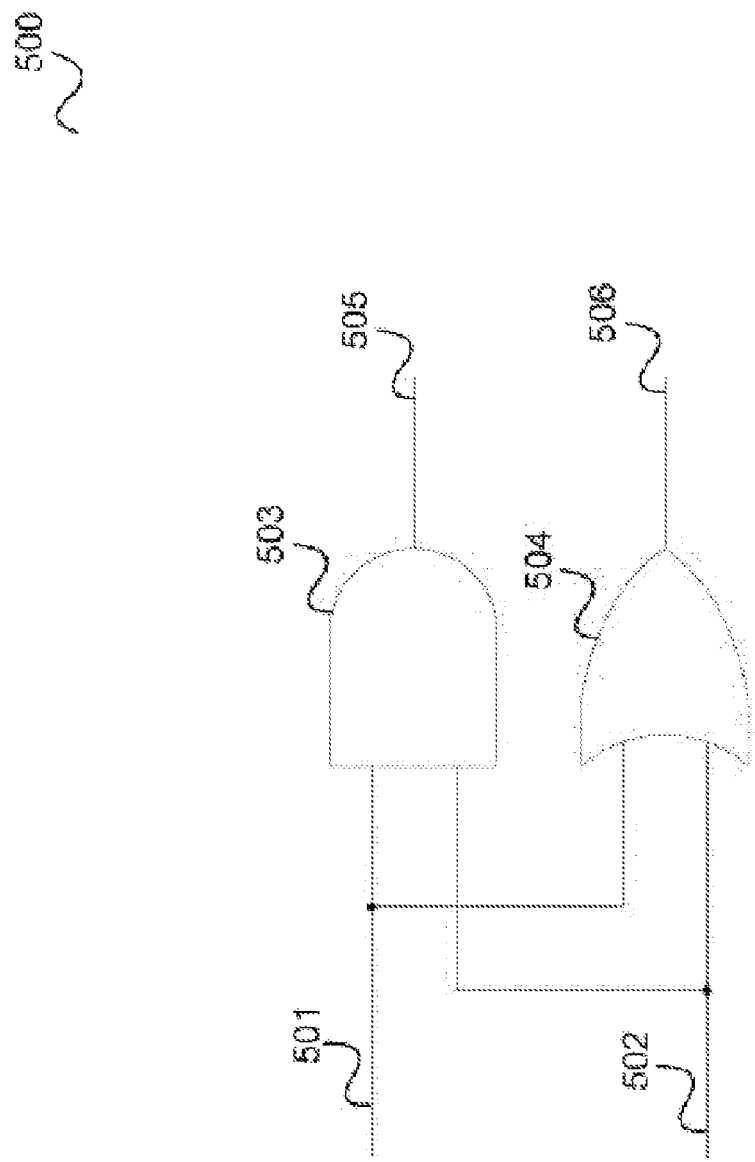
FIG. 5 shows a sorter.

For example, the sorters 402 have the structure as illustrated in FIG. 5.

FIG. 5 shows a sorter 500.

The sorter 500 includes a first input 501 and a second input 502 which are both connected to an AND gate 503 and an OR gate 504. The output of the AND gate 503 forms a first output 505 of the sorter 500 and the output of the OR gate 504 forms a second output 506 of the sorter 500.

As can be seen, both inputs (1, 0) and (0, 1) (in the notation (first input, second input)) are associated with (0, 1) (in the notation (first output, second output)). The combination (1, 0) can thus be seen to be effectively removed as a possible combination to be stored or supplied to a full adder for the next addition.

In a modular multiplication or the like it is more typically used when performing a public key method, the following patterns each arising with a probability of 1/4 for the bit pair $(s_i, t_i)$:

$(s_i, t_i)=(0, 0)$: bit $z_i$ has the value 0, no carry.
$(s_i, t_i)=(0, 1)$: bit $z_i$ has the value 1, no carry.
$(s_i, t_i)=(1, 0)$: bit $z_i$ has the value 1, no carry.
$(s_i, t_i)=(1, 1)$: bit $z_i$ has the value 0, carry.

In such a typical operation the average number of state transitions in the two bits $(s_i, t_i)$ is 1. By sorting a calculated result before storing and resupplying to the full adder, as described with reference to FIG. 5, the patterns $(s_i, t_i)=(0, 1)$ and $(s_i, t_i)=(1, 0)$ are combined to form a single pattern. Thus, in about ¼ of all cases there is no state transition of the bits $s_i$ and $t_i$ and there is no need to reload signal lines following the adder. In ⅛ of all cases, the double state transition $(0, 1) \to (1, 0)$ or $(1, 0) \to (0, 1)$ is avoided. This means that the average number of state transitions with the sorting is 0.75, i.e. the sorting achieves a reduction of 25%.

Figure 6:
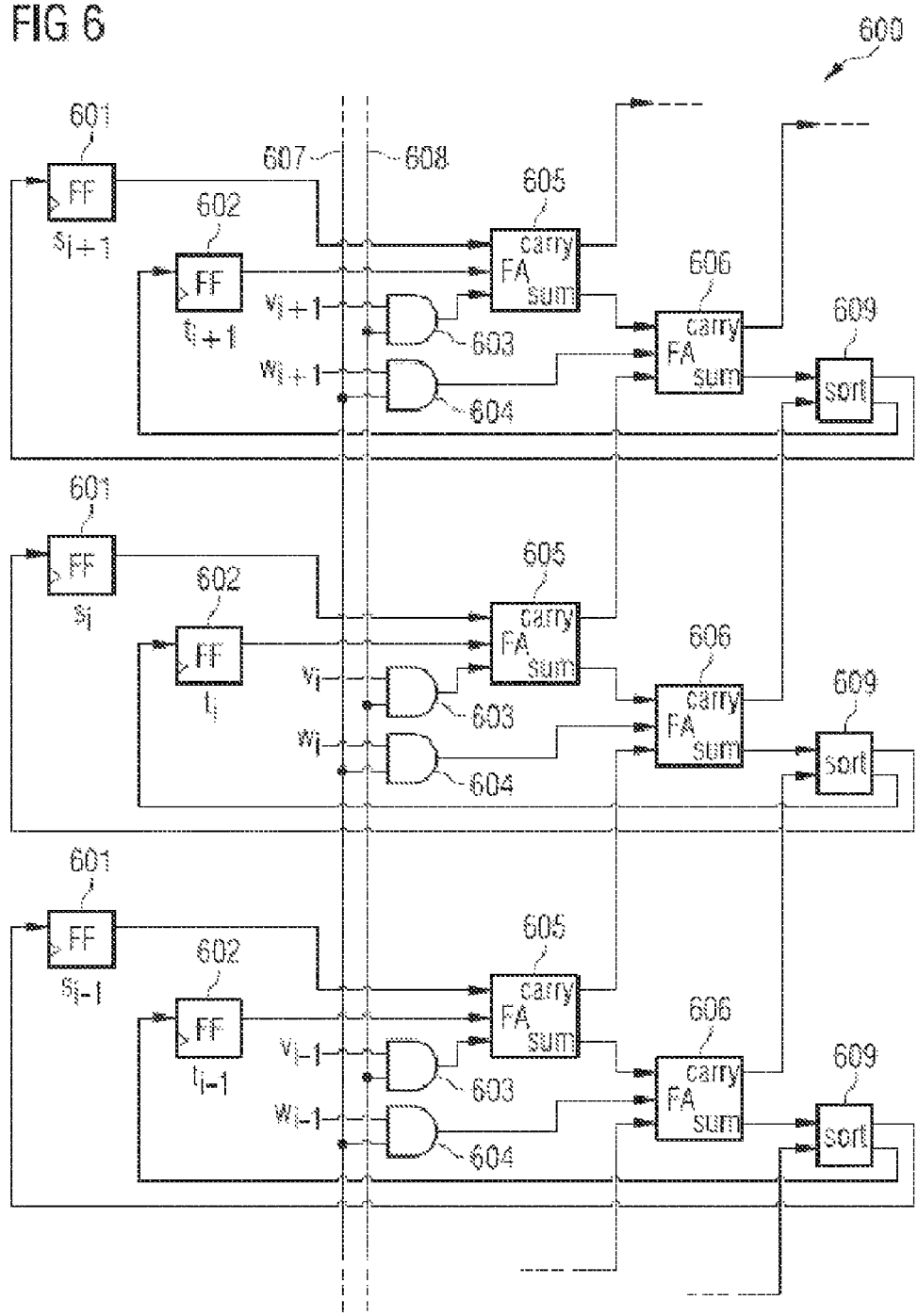
FIG. 6 shows an adder according to an embodiment, for example for an algorithmic logic unit for accelerating modular multiplications in public key operations.

FIG. 6 shows an adder 600 according to an embodiment, for example for an algorithmic logic unit for accelerating a modular multiplication in a public key operation.

The adder 600 serves for adding numbers v and w to the current (accumulated) addition result in redundant representation (s, t), i.e. for the operation (s, t):=(s, t)+v+w.

For each digit of the binary numbers s, t, v, w, the adder 600 includes a first flip-flop 601, a second flip-flop 602, a first AND gate 603, a second AND gate 604, a first full adder 605 and a second full adder 606.

For the ith digit (in other words per slice of the adder), the first flip-flop 601 serves as accumulator for $s_i$ and the second flip-flop 602 serves as accumulator for $t_i$. In other words, the flip-flops 601, 602 serve as accumulators for storing the numbers s, t of the carry-save representation of the result calculated so far.

The first full adders 605 serve for adding a partial product represented by the output of the first AND gate 603 in dependence on a second operand of the multiplication.

The second full adders 606 serve for adding a reduction value for the calculation of the modular remainder of the addition result (updated by the addition by the first full adders 605).

The first AND gates 603 calculate the partial product as v if a first input line 607 coupled to the first AND gates 603 is set to 1, and otherwise as 0.

The second AND gates 604 calculate the reduction value as w if a second input line 608 coupled to the second AND gates 603 is set to 1, and otherwise as 0.

The adder 600 further includes sorters 609 which reduce the number of state transitions which occur when storing the current addition result in the flip-flops 601, 602. The ith sorter 609 for example functions as explained with reference to FIG. 5 and receives the sum bit of the second full adder 606 for the ith digit (as its first input) and the carry bit of the second full adder 606 for the i−1th digit (as its second input).

The embodiment illustrated in FIG. 6 may be further optimized. For example, the partial product and the reduction value may be sorted before their addition by the full adders 605, 606. Thus, the number of state transitions within one slice can be reduced further. This may for example be achieved by replacing the first AND gate 603 and the second AND gate 604 with the circuit illustrated in FIG. 7.

Figure 7:
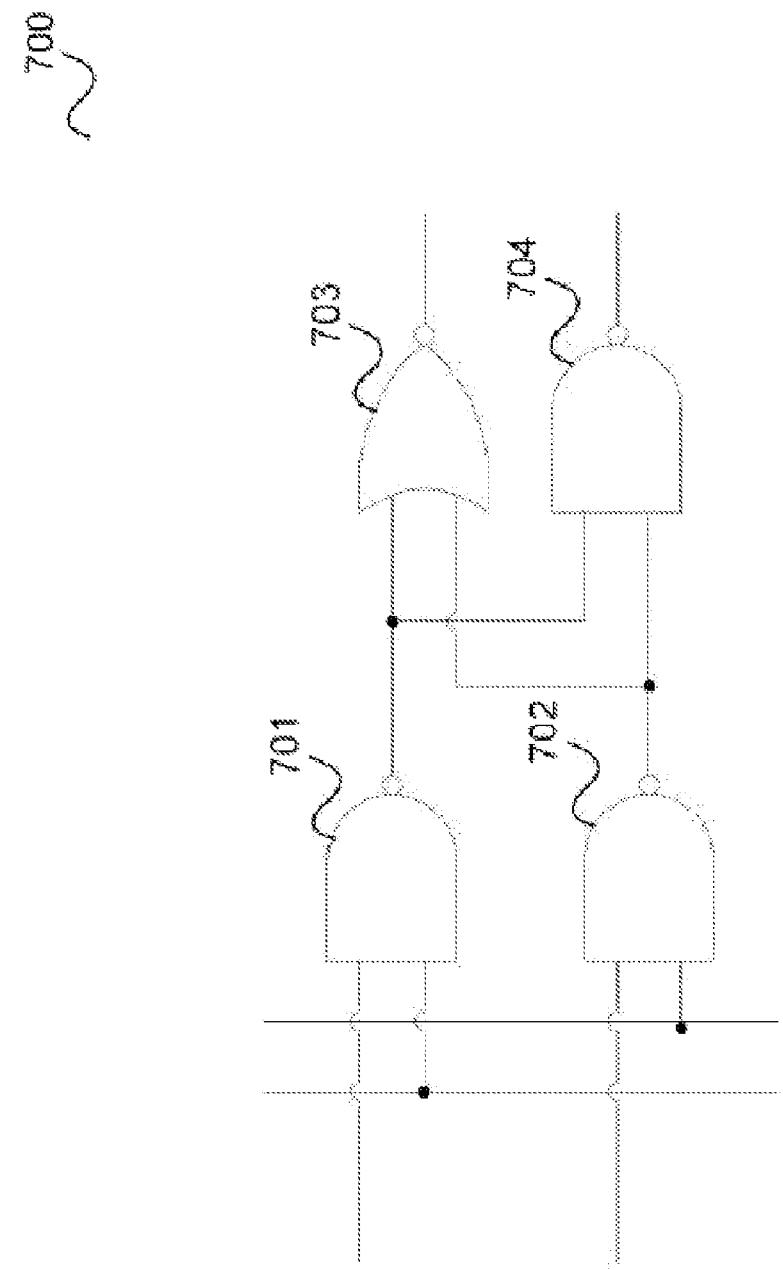
FIG. 7 shows a circuit for generating and sorting bits of a partial product and a reduction value.

FIG. 7 shows a circuit 700 for generating and sorting bits of a partial product and a reduction value.

The circuit 700 includes a first NAND gate 701 having the inputs of the first AND gate 603 and a second NAND gate 702 having the inputs of the second AND gate 604. The output of the first NAND gate 701 is supplied to a NOR gate 703 and a third NAND gate 704 and the output of the second NAND gate 702 is supplied to the NOR gate 703 and the third NAND gate 704.

The output of the NOR gate 703 is supplied to the first full adder 605 and the output of the third NAND gate 704 is supplied to the second full adder 606 (similar to the outputs of the first AND gate 603 and the second AND gate 604).

Further optimization of the adder 600 can be achieved by combining circuit parts and thus saving transistors. In the following, an example is given of how the sorters 609 may be combined with the subsequent flip-flops 601, 602 forming the accumulator.

Figure 8:
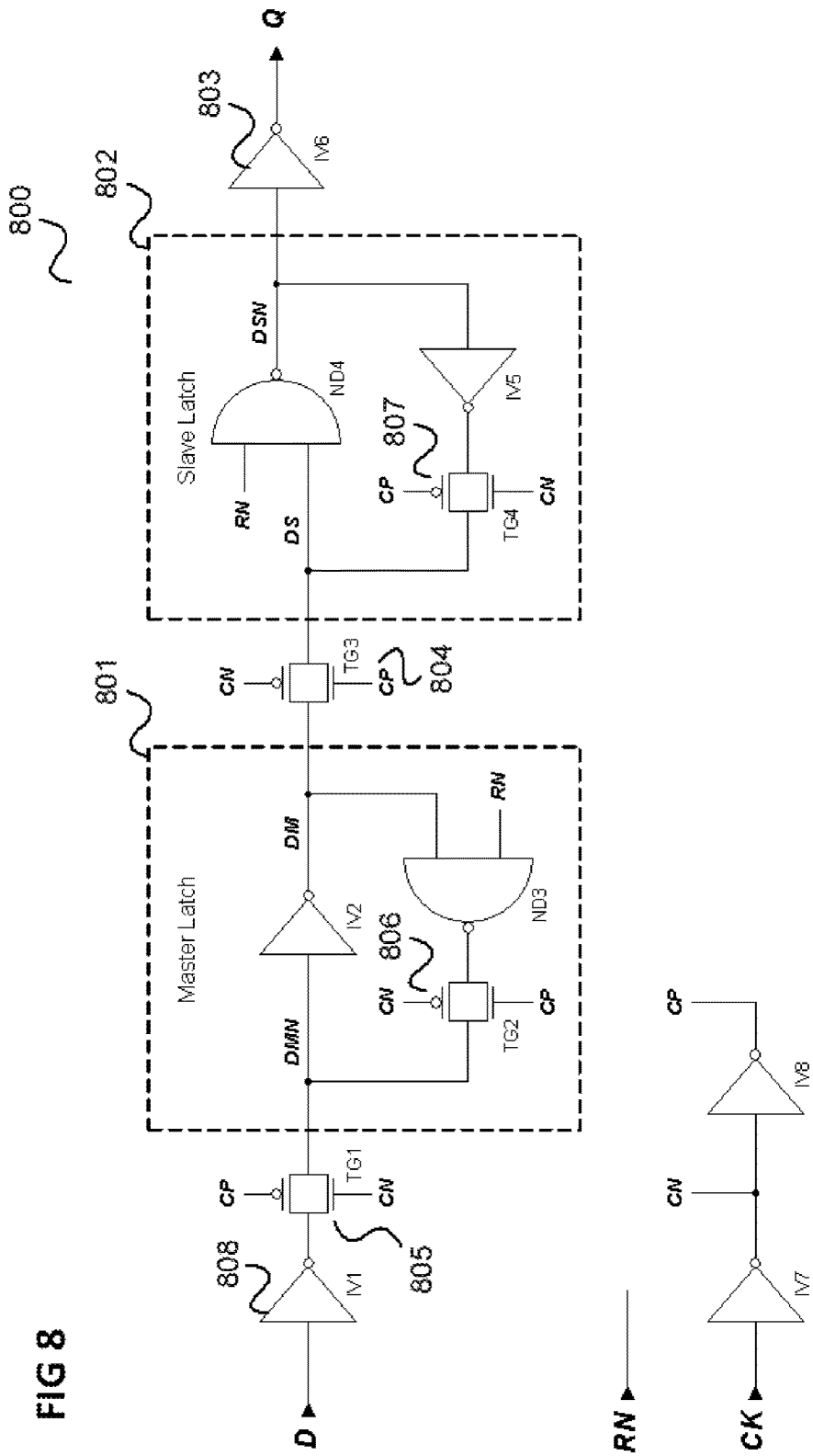
FIG. 8 shows an edge triggered CMOS register with asynchronous reset.

FIG. 8 shows an edge triggered CMOS register 800 with asynchronous reset.

The register 800 includes as memory elements a master latch 801 and a slave latch 802. For an activated reset signal RN (i.e. for RN=0), the output node DSN of the slave latch 802 is set to 1 and thus the output Q of the register 800 (which is connected to the output node DSN of the slave latch 802 by an output inverter 803) is set to zero. This happens regardless of the state of the clock signal CK. The output node DM of the master latch 801 is set to zero for RN=0 when CK=1. It should be noted that signals CN and CP are generated from the single and double inversion, respectively, of the clock signal CK.

When the reset is deactivated, i.e. RN=1, and there is a rising clock edge of the clock signal CK, the data bit supplied to input D of the register 800 at this time is held by the master latch 801 and is fed via a first transfer gate 804 (which is switched to a conductive state by CP) and via the slave latch 802 (which is transparent for CK=1) to the output Q of the register 800. It should be mentioned that with CK=1 and thus CN=0 and CP=1 a second transmission gate 805, via which the data input D is connected to the master latch 801, is in a non-conductive state, such that the data input is isolated from the master latch node DMN and the master latch output node DM and the feedback via the transmission gate 806 within the master latch 801 is activated.

By contrast, after the falling edge, i.e. for CK=0, the slave latch 802 is isolated from the master latch 801 by the first transmission gate 804 and holds the bit earlier received from the master latch 801, since the feedback via the transmission gate 807 within the slave latch 802 is active. The bit supplied to the input D is transferred to the master latch via an input inverter 808 and the second transfer gate 805 for CK=0.

Figure 9:
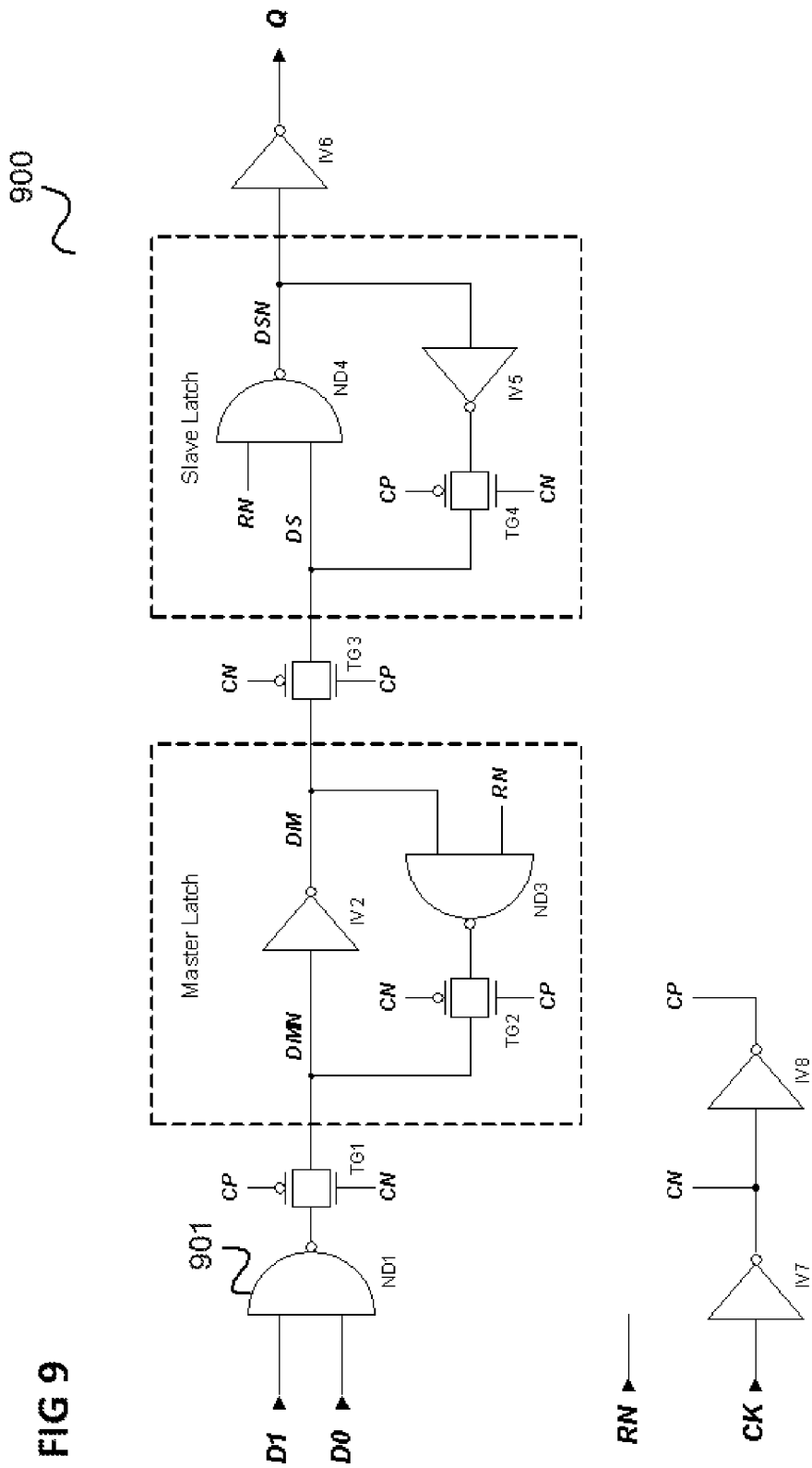
FIG. 9 shows a register in which the input inverter of the register is replaced by a NAND gate.

FIG. 9 shows a register 900 in which the input inverter of the register 800 is replaced by a NAND gate 901.

The register 900 has two inputs D1 and D0 which are formed by the inputs of the NAND gate 901 such that for CK=0 the state of the master latch node DMN is the NAND combination of the input bits supplied at D1 and D0. By contrast, in the register 800 the bit supplied at the input D is inverted by the input inverter 808 such that for CK=0 the state of the master latch node DMN is the inverted input bit. Thus, the two-input AND register 900 corresponds to the register 800 with an AND gate at its data input D, such that instead of an AND gate in addition to an input inverter only one NAND gate is necessary (which allows the transistor functions at the data input to be reduced from 8 to 4), allowing a correspondingly low power consumption.

Figure 10:
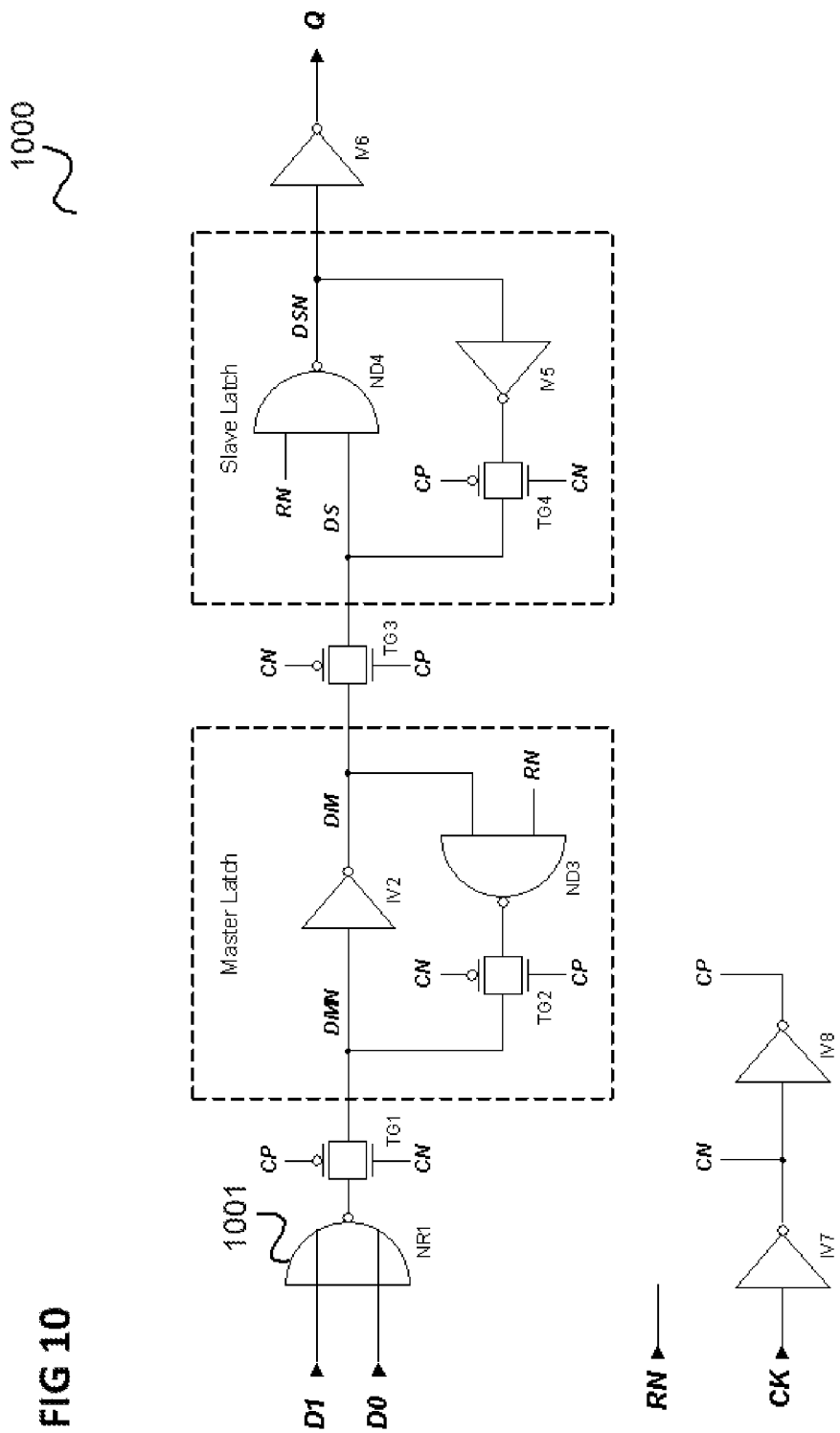
FIG. 10 shows, analogously to FIG. 9, a register in which the input inverter of the register is replaced by a NOR gate.

FIG. 10 shows, analogously to FIG. 9, a register 1000 in which the input inverter of the register 800 is replaced by a NOR gate 1001.

The register 1000 has two inputs D1 and D0 which correspond to the inputs of the NOR gate 1001 such that for CK=0 the state of the master latch node DMN is the NOR combination of the input bits supplied at D1 and D0. Thus, the two-input OR register 1000 corresponds to the register 800 with an OR gate at its data input D, such that instead of an OR gate in addition to an input inverter only one NOR gate is necessary (which allows the transistor functions at the data input to be reduced from 8 to 4), allowing a correspondingly low power consumption.

Figure 11:
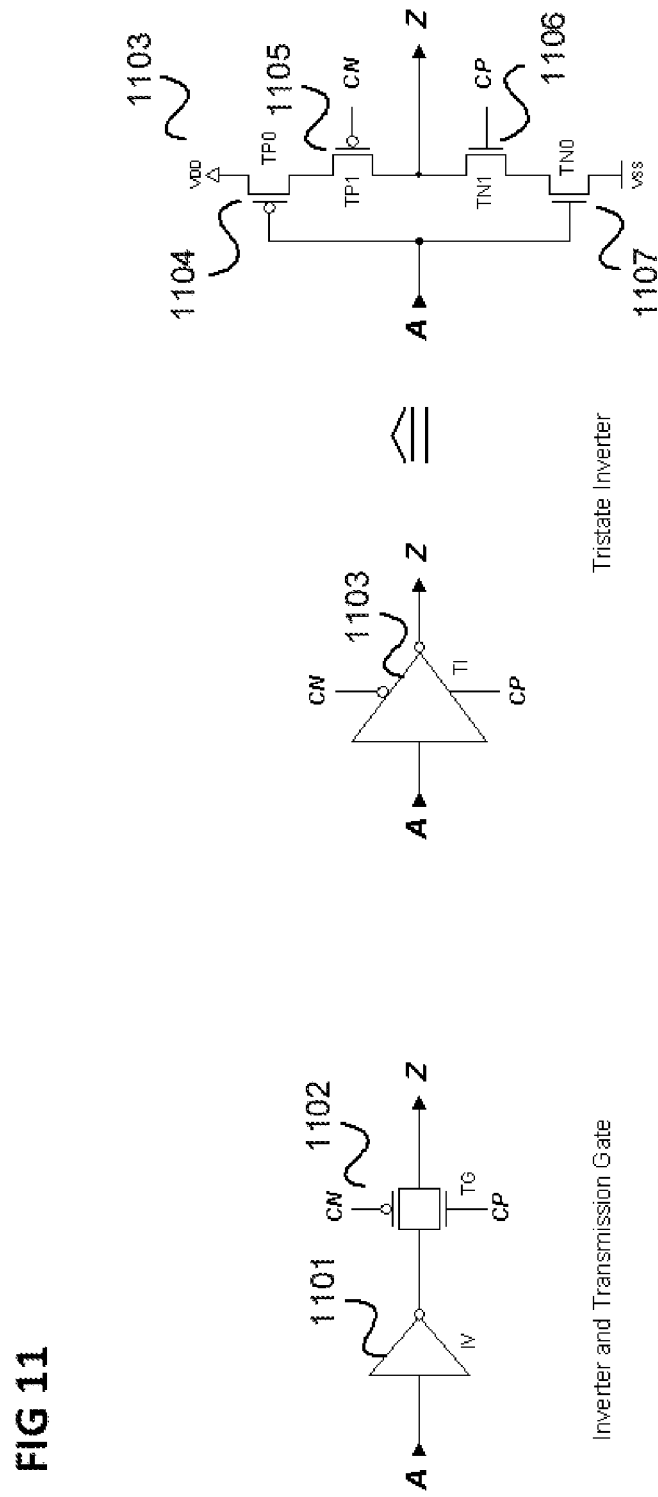
FIG. 11 shows the possibility of combining a serial connection of an inverter and a transmission gate to form a tristate inverter.
Figure 12:
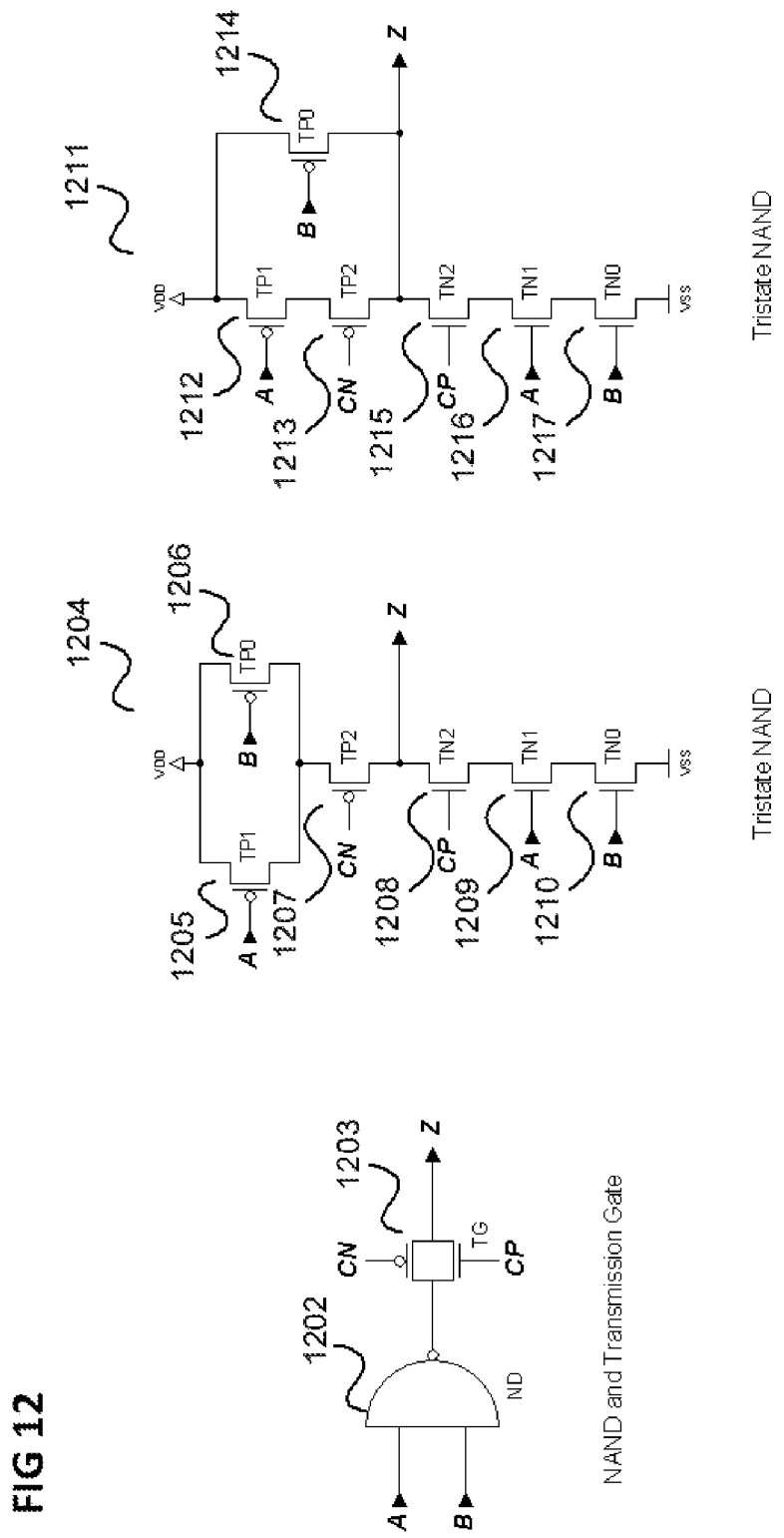
FIG. 12 shows the possibility of combining a serial connection of a NAND gate and a transmission gate to form a tristate NAND.

Further possibilities for creating variants of the circuits shown in FIG. 8 to FIG. 10 are illustrated in FIG. 11 and FIG. 12.

FIG. 11 illustrates the possibility of combining a serial connection of an inverter 1101 and a transmission gate 1102 to form a tristate inverter 1103.

The tristate inverter 1103 includes a first p channel field effect transistor (FET) 1104 whose source is connected to the high supply potential (VDD) and whose drain is connected to the source of a second p channel FET 1105. The drain of the second p channel FET 1105 is connected to the output Z and to the drain of a first n channel FET 1106 whose source is connected to the drain of a second n channel FET 1107 whose source is connected to the low supply potential (VSS). The gate of the first p channel FET 1104 and the gate of the second n channel FET 1107 are connected to the input A. The gate of the second p channel FET 1105 and the gate of the first n channel FET 1106 are supplied with the signals CN and CP, respectively.

FIG. 12 illustrates the possibility of combining a serial connection of a NAND gate 1202 and a transmission gate 1203 to form a tristate NAND 1204, 1211.

The tristate NAND has, in its first version 1204, a first p channel FET 1205 and a second p channel FET 1206 whose sources are connected to the high supply potential and whose drains are connected to the source of a third p channel FET 1207. The drain of the third p channel FET 1207 is connected to an output Z and the drain of a first n channel FET 1208. The source of the first n channel FET 1208 is connected to the drain of a second n channel FET 1209 whose source is connected to the drain of a third n channel FET 1210 whose source is connected to the low supply potential.

The gate of the first p channel FET 1205 and the gate of the second n channel FET 1209 are connected to the first input A and the gate of the second p channel FET 1206 and the gate of the third n channel FET 1210 are connected to the second input B. The gate of the third p channel FET 1207 is supplied with the signal CN and the gate of the first n channel FET 1208 is supplied with the signal CP.

In its second version 1211, the tristate NAND has a first p channel FET 1212 whose source is connected to the high supply potential and whose drain is connected to the source of a second p channel FET 1213 whose drain is connected to an output Z.

Further, the tristate NAND 1211 includes a third p channel FET 1214 whose source is connected to the high supply potential and whose drain is connected to the output Z.

The drain of the second p channel FET 1213 and the drain of the third p channel FET 1214 are further connected to the drain of a first n channel FET 1215. The source of the first n channel FET 1215 is connected to the drain of a second n channel FET 1216 whose source is connected to the drain of a third n channel FET 1216 whose source is connected to the low supply potential.

The gate of the first p channel FET 1212 and the gate of the second n channel FET 1216 are connected to the first input A and the gate of the third p channel FET 1214 and the gate of the third n channel FET 1217 are connected to the second input B. The gate of the second p channel FET 1213 is supplied with the signal CN and the gate of the first n channel FET 1215 is supplied with the signal CP.

Analogously to the replacement of a NAND gate and a transmission gate by a tristate NAND as illustrated in FIG. 12, a serial connection of a NOR gate and a transmission gate can be replaced by a tristate NOR.

Based on the combinations of the variants described above, it is possible to provide an adder having a reduced number of state transitions as described above by using only four additional transistors per slice, i.e. per digit of the added long numbers. Simulations show that this allows a reduction of the power consumption by 15%-20%.

The text below describes an embodiment in which the reduction in the value patterns that occur, which reduction results from the sorting of the input values of the full adders 605, is used to simplify the implementation of the full adders 605. An example of an efficient circuit for implementing a full adder in static CMOS is what is known as the mirror adder, the implementation of which (give an output of the inverted sum and carry bits) typically requires 24 transistor functions. Allowing for the fact that two of the three input values of the full adder 605 are already available in sorted form, it is possible to use an implementation that requires just 16 transistor functions. In addition to the reduction in hardware complexity, this also results in a further reduction in average power draw.

The entire circuit complexity for the sorting of unsorted input values and the subsequent addition using a full adder (which can process unsorted input values) is typically higher than addition by comparable full adders such as the mirror adder without preceding sorting. If the input values are already available in sorted form as in the adder 600, however, for example in order to thereby decrease the average number of state changes for other circuit portions and to lower the power draw, then the circuit complexity and the power draw can be reduced, as described below. In some of the exemplary embodiments described below, the number of transistors required in a circuit including a sorter and a reduced added is exactly as high as in the case of an adding stage that can process unsorted input values, alone.

Like the adder 600, adders for long numbers are typically implemented by a large number of full adder cells. A full adder takes three input bits and calculates a sum bit and a carry bit according to the sum of the three input bits. (In this case, the sum bit is the XOR function and the carry bit is the majority function of the input bits). A cell of a full adder is a comparatively complicated and complex circuit in hardware. Clever combination of partial terms, which need to be formed in order to calculate the sum and carry bits, allows the implementation of the adder cell to be optimized. One efficient implementation is what is known as the mirror adder, as shown in FIG. 13.

Figure 13:
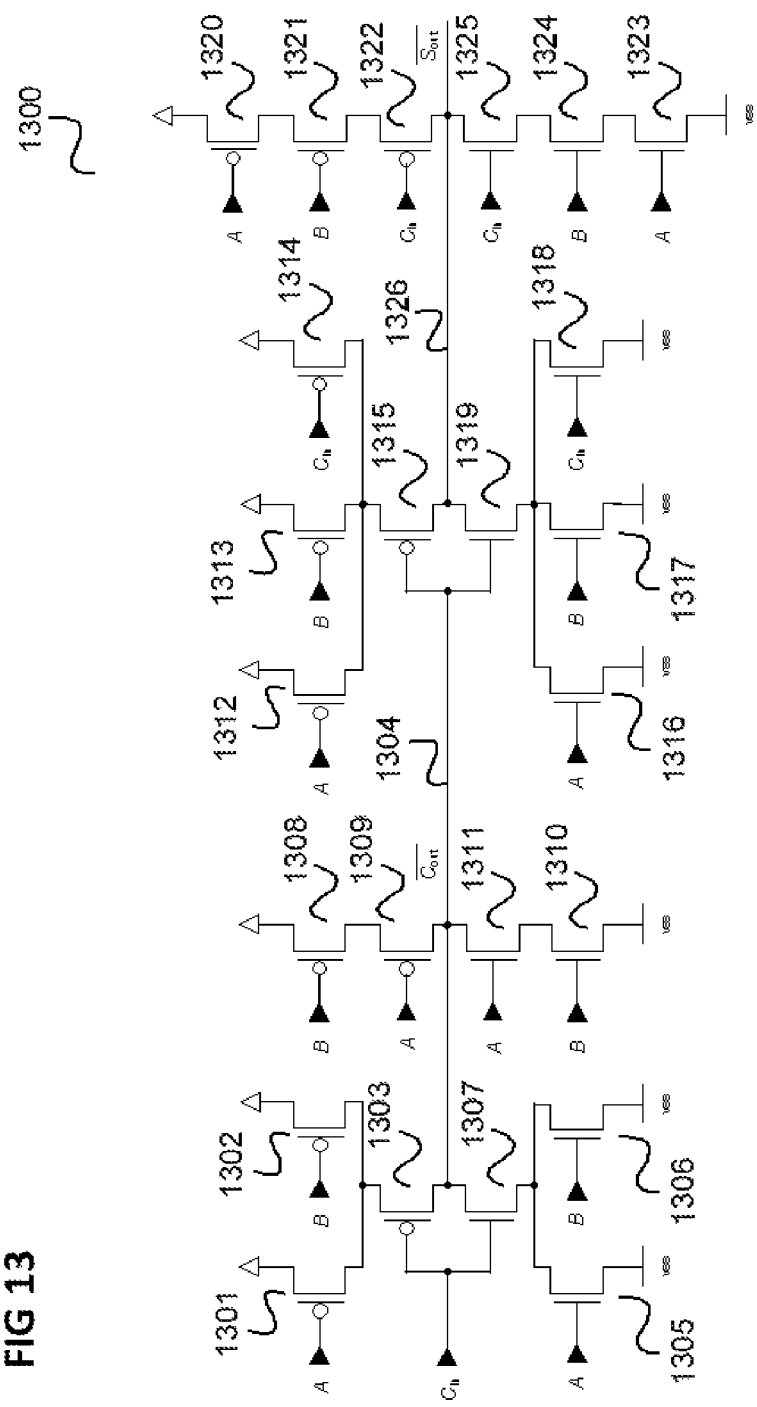
FIG. 13 shows a mirror adder circuit.

FIG. 13 shows a mirror adder circuit 1300.

The mirror adder circuit 1300 calculates the sum bit $S_{out}$ and the carry bit $C_{out}$ according to the sum of the input bits A, B and $C_{in}$.

The mirror adder circuit 1300 has a first p channel FET 1301 whose source is connected to the high supply potential and whose gate is supplied with the input value A. The mirror adder circuit 1300 further has a second p channel FET 1302 whose source is connected to the high supply potential and whose gate is supplied with the input value B.

The drains of the first p channel FET 1301 and the second p channel FET 1302 are connected to the source of a third p channel FET 1303 whose gate is supplied with the input value $C_{in}$ and whose drain is connected to a first node 1304 that assumes the level of the complementary carry bit $\overline{C_{out}}$.

The mirror adder circuit 1300 further has a first n channel FET 1305 whose source is connected to the low supply potential and whose gate is supplied with the input value A. The mirror adder circuit 1300 further has a second n channel FET 1306 whose source is connected to the low supply potential and whose gate is supplied with the input value B.

The drains of the first n channel FET 1305 and the second n channel FET 1306 are connected to the source of a third n channel FET 1307 whose gate is supplied with the input value $C_{in}$ and whose drain is connected to a first node 1304.

The mirror adder circuit 1300 further has a fourth p channel FET 1308 whose source is connected to the high supply potential, whose gate is supplied with the input value B and whose drain is connected to the source of a fifth p channel FET 1309 whose gate is supplied with the input value A and whose drain is connected to the first node 1304.

The mirror adder circuit 1300 further has a fourth n channel FET 1310 whose source is connected to the low supply potential, whose gate is supplied with the input value B and whose drain is connected to the source of a fifth n channel FET 1311 whose gate is supplied with the input value A and whose drain is connected to the first node 1304.

The mirror adder circuit 1300 further has a sixth p channel FET 1312 whose source is connected to the high supply potential and whose gate is supplied with the input value A. The mirror adder circuit 1300 further has a seventh p channel FET 1313 whose source is connected to the high supply potential and whose gate is supplied with the input value B, and further has an eighth p channel FET 1314 whose source is connected to the high supply potential and whose gate is supplied with the input value $C_{in}$. The drains of the sixth p channel FET 1312, the seventh p channel FET 1313 and the eighth p channel FET 1314 are connected to the source of a ninth p channel FET 1315 whose gate is connected to the first node 1304 and whose drain is connected to a second node 1326 that assumes the level of the complementary sum bit $\overline{S_{out}}$.

The mirror adder circuit 1300 further has a sixth n channel FET 1316 whose source is connected to the low supply potential and whose gate is supplied with the input value A. The mirror adder circuit 1300 further has a seventh n channel FET 1317 whose source is connected to the low supply potential and whose gate is supplied with the input value B, and further has an eighth n channel FET 1318 whose source is connected to the low supply potential and whose gate is supplied with the input value $C_{in}$. The drains of the sixth n channel FET 1316, the seventh n channel FET 1317 and the eighth n channel FET 1318 are connected to the source of a ninth n channel FET 1319 whose gate is connected to the first node 1304 and whose drain is connected to the second node 1326.

The mirror adder circuit 1300 further has a tenth p channel FET 1320 whose source is connected to the high supply potential and whose gate is supplied with the input value A and whose drain is connected to the source of an eleventh p channel FET 1321 whose gate is supplied with the input value B and whose drain is connected to the source of a twelfth p channel FET 1322 whose gate is supplied with the input value $C_{in}$ and whose drain is connected to the second node 1326.

The mirror adder circuit 1300 further has a tenth n channel FET 1323 whose source is connected to the low supply potential, whose gate is supplied with the input value A and whose drain is connected to the source of an eleventh n channel FET 1324 whose gate is supplied with the input value B and whose drain is connected to the source of a twelfth n channel FET 1325 whose gate is supplied with the input value $C_{in}$ and whose drain is connected to the second node 1326.

In a mirror adder as shown in FIG. 13, the pull up networks and the pull down networks of the circuit are typically not formed in complementary fashion with respect to one another, as is otherwise customary for the design of CMOS circuits. The high level of symmetry in the function to be calculated is reflected directly in the circuit. In order to implement a full adder cell (with inverted output signals), this adder requires 24 transistor functions or 6 gate equivalents.

Since use as a full adder 605 involves the input values being presorted in the adder 600, however, particular patterns of input values cannot arise. If, by way of example, it is assumed that for the input bits A and B the condition A≤B is always met, this means that the states of the AND circuits and the OR circuits for bits A and B in the pull up and pull down networks of the mirror adder are now dependent only on one of the values and the circuit can be simplified accordingly:

a) A parallel circuit including two p channel FETs in a pull up network is conducted when A=0.

b) A series circuit including two p channel FETs in a pull up network is conducted when B=0.

c) A parallel circuit including two n channel FETs in a pull down network is conducted when B=1.

d) A series circuit including two n channel FETs in a pull down network is conducted when A=1.

Figure 14:
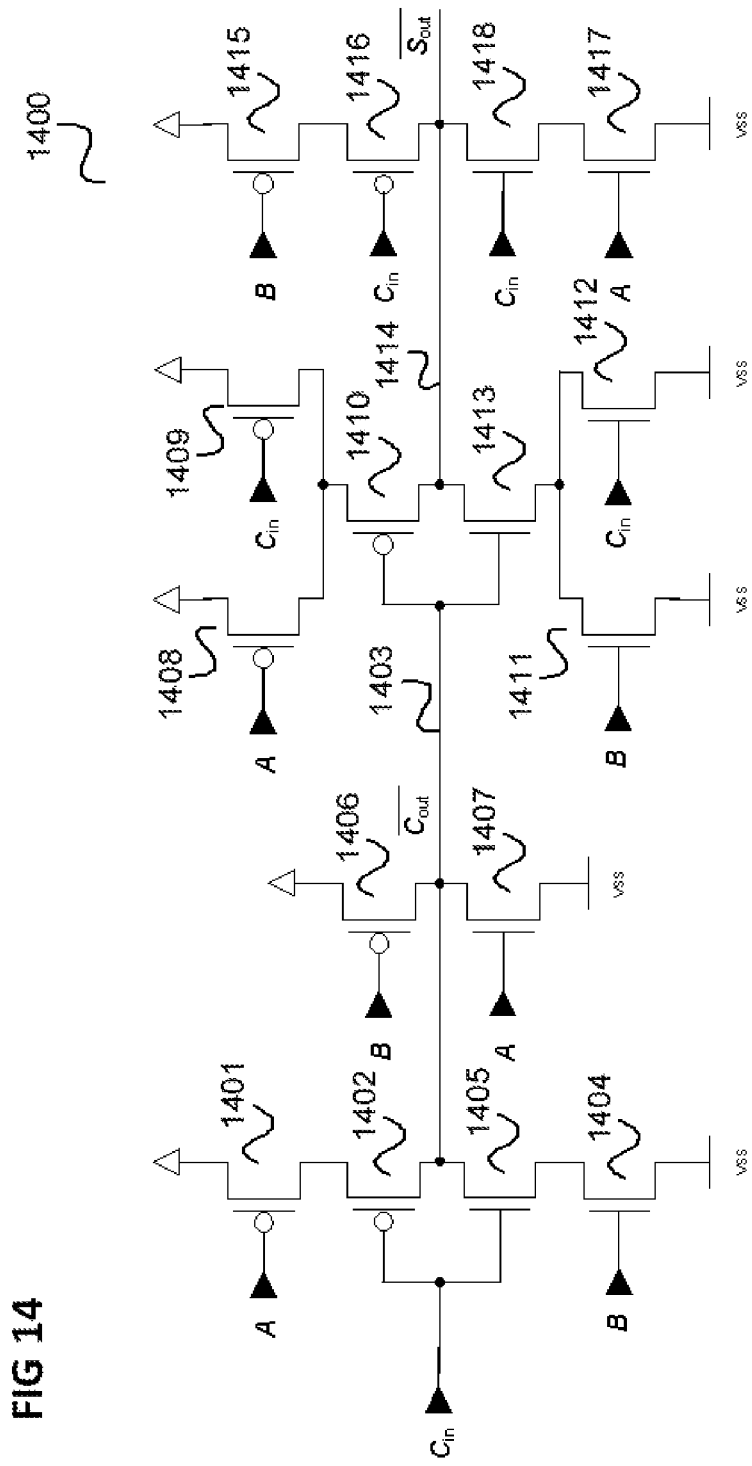
FIG. 14 shows a reduced mirror adder circuit.

On the basis of these properties, according to one embodiment, the (reduced) variant shown in FIG. 14 for a mirror adder circuit with 16 transistor functions is used, for example as full adder 605.

FIG. 14 shows a mirror adder circuit 1400.

The mirror adder circuit 1400 calculates the complementary sum bit $\overline{S_{out}}$ and the complementary carry bit $\overline{C_{out}}$ according to the sum of the input bits A, B and $C_{in}$.

The mirror adder circuit 1400 has a first p channel FET 1401 whose source is connected to the high supply potential, whose gate is supplied with the input value A and whose drain is connected to the source of a second p channel FET 1402 whose gate is supplied with the input value $C_{in}$ and whose drain is connected to a first node 1403 that assumes the level of the complementary carry bit $\overline{C_{out}}$.

The mirror adder circuit 1400 further has a first n channel FET 1404 whose source is connected to the low supply potential, whose gate is supplied with the input value B and whose drain is connected to the source of a second n channel FET 1405 whose gate is supplied with the input value $C_{in}$ and whose drain is connected to the first node 1403.

The mirror adder circuit 1400 further has a third p channel FET 1406 whose source is connected to the high supply potential, whose gate is supplied with the input value B and whose drain is connected to the first node 1403. Further, the mirror adder circuit 1400 has a third n channel FET 1407 whose source is connected to the low supply potential, whose gate is supplied with the input value A and whose drain is connected to the first node 1403.

The mirror adder circuit 1400 further has a fourth p channel FET 1408 whose source is connected to the high supply potential and whose gate is supplied with the input value A. The mirror adder circuit 1400 further has a fifth p channel FET 1409 whose source is connected to the high supply potential and whose gate is supplied with the input value $C_{in}$. The drains of the fourth p channel FET 1408 and the fifth p channel FET 1409 are connected to the source of a sixth p channel FET 1410 whose gate is connected to the first node 1403 and whose drain is connected to a second node 1414 that assumes the level of the complementary sum bit $\overline{S_{out}}$.

The mirror adder circuit 1400 further has a fourth n channel FET 1411 whose source is connected to the low supply potential and whose gate is supplied with the input value B. The mirror adder circuit 1400 further has a fifth n channel FET 1412 whose source is connected to the low supply potential and whose gate is supplied with the input value $C_{in}$. The drains of the fourth n channel FET 1411 and the fifth n channel FET 1412 are connected to the source of a sixth n channel FET 1413 whose gate is connected to the first node 1403 and whose drain is connected to the second node 1414.

The mirror adder circuit 1400 further has a seventh p channel FET 1415 whose source is connected to the high supply potential, whose gate is supplied with the input value B and whose drain is connected to the source of an eighth p channel FET 1416 whose gate is supplied with the input value $C_{in}$ and whose drain is connected to the second node 1414.

The mirror adder circuit 1400 further has a seventh n channel FET 1417 whose source is connected to the low supply potential, whose gate is supplied with the input value A and whose drain is connected to the source of an eighth n channel FET 1418 whose gate is supplied with the input value $C_{in}$ and whose drain is connected to the second node 1414.

When the condition A≤B is met, the reduced mirror adder circuit 1400 calculates the inverted values of the sum bit and the carry bit of the three applied values A, B and $C_{in}$. If A=1 and B=0, the pull up networks and pull down networks become conductive simultaneously, however, and cause a short when the inverted carry bit is calculated.

Figure 15:
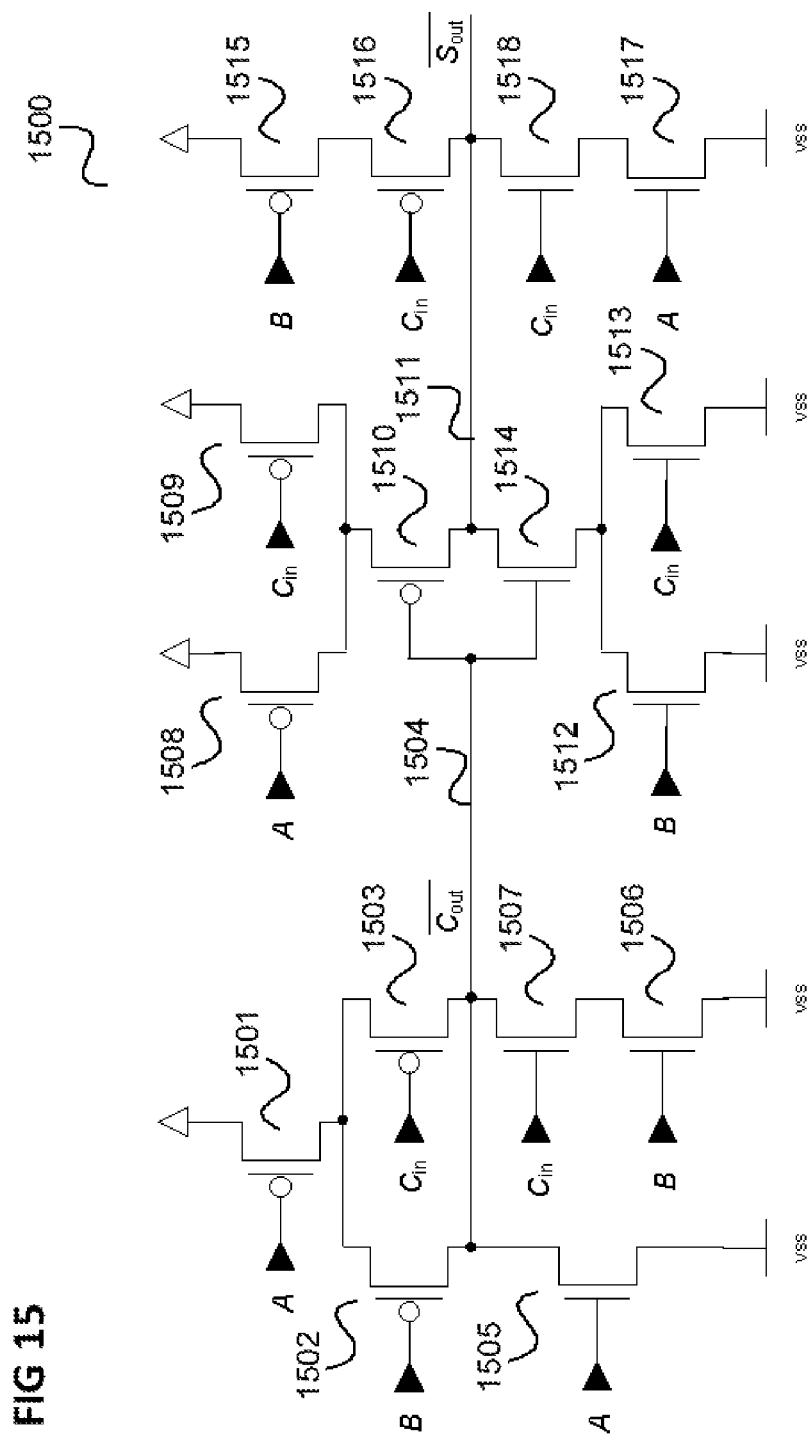
FIG. 15 shows a further reduced mirror adder circuit.

FIG. 15 shows a further reduced mirror adder circuit 1500 according to an embodiment with 16 transistor functions that uses complementary pull up networks and pull down networks according to a standard CMOS design in a circuit part for calculating the carry bit.

The mirror adder circuit 1500 likewise calculates the inverted values of the sum bit and the carry bit of the sum of the three applied values A, B and $C_{in}$ when the condition A≤B is met. If A=1 and B=0, erroneous values are output for sum bit and carry bit without pull up networks and pull down networks driving against one another. If, in an adder that uses the mirror adder circuit as full adder, the condition A≤B ensures that this case does not arise during operation, the erroneous values have no influence on the way in which the adder works.

The mirror adder circuit 1500 has a first p channel FET 1501 whose gate is supplied with the input value A and whose source is connected to the high supply potential and whose drain is connected to the sources of a second p channel FET 1502, whose gate is supplied with the input value B, and of a third p channel FET 1503, whose gate is supplied with the input value $C_{in}$. The drains of the second p channel FET 1502 and the third p channel FET 1503 are connected to a first node 1504 that assumes the level of the complementary carry bit $\overline{C_{out}}$.

The mirror adder circuit 1500 further has a first n channel FET 1505 whose source is connected to the low supply potential and whose drain is connected to the first node 1504 and whose gate is supplied with the input value A.

Further, the mirror adder circuit 1500 has a second n channel FET 1506 whose source is connected to the low supply potential, whose gate is supplied with the input value B and whose drain is connected to the source of a third n channel FET 1507 whose gate is supplied with the input value $C_{in}$ and whose drain is connected to the first node 1504.

The mirror adder circuit 1500 has a fourth p channel FET 1508 whose source is connected to the high supply potential and whose gate is supplied with the input value A. The mirror adder circuit 1500 further has a fifth p channel FET 1509 whose source is connected to the high supply potential and whose gate is supplied with the input value $C_{in}$. The drains of the fourth p channel FET 1508 and the fifth p channel FET 1509 are connected to the source of a sixth p channel FET 1510 whose gate is connected to the first node 1504 and whose drain is connected to a second node 1511 that assumes the level of the complementary sum bit $\overline{S_{out}}$.

The mirror adder circuit 1500 further has a fourth n channel FET 1512 whose source is connected to the low supply potential and whose gate is supplied with the input value B. The mirror adder circuit 1500 further has a fifth n channel FET 1513 whose source is connected to the low supply potential and whose gate is supplied with the input value $C_{in}$.

The drains of the fourth n channel FET 1512 and the fifth n channel FET 1513 are connected to the source of a sixth n channel FET 1514 whose gate is connected to the first node 1504 and whose drain is connected to the second node 1511.

The mirror adder circuit 1500 further has a seventh p channel FET 1515 whose source is connected to the high supply potential, whose gate is supplied with the input value B and whose drain is connected to the source of an eighth p channel FET 1516 whose gate is supplied with the input value $C_{in}$ and whose drain is connected to the second node 1514.

The mirror adder circuit 1500 further has a seventh n channel FET 1517 whose source is connected to the low supply potential, whose gate is supplied with the input value A and whose drain is connected to the source of an eighth n channel FET 1518 whose gate is supplied with the input value $C_{in}$ and whose drain is connected to the second node 1514.

The mirror adder circuit 1500 calculates carry bit and sum bit from the input values according to the following table of values:

TABLE 1

| A | B | $C_{in}$ | $\overline{C_{out}}$ | $\overline{S_{out}}$ |
|---|---|---|---|---|
| 0 | 0 | 0 | 1 | 1 |
| 0 | 0 | 1 | 1 | 0 |
| 0 | 1 | 0 | 1 | 0 |
| 0 | 1 | 1 | 0 | 1 |
| 1 | 0 | 0 | 0 | 1 |
| 1 | 0 | 1 | 0 | 0 |
| 1 | 1 | 0 | 0 | 1 |
| 1 | 1 | 1 | 0 | 0 |

A full adder circuit can be simplified in a similar manner if the condition A≥B is always met. Furthermore, similar AND structures and OR structures to in the mirror adder circuit 1300 can be found in many full adder circuits. Accordingly, the techniques described for simplifying circuits using presorted input values are not limited to the mirror adder and can be applied to many other circuits in a similar manner.

The simplification of circuits according to various embodiments, such as of the mirror adder circuit 1300 to form the mirror adder circuit 1400 or the mirror adder circuit 1500, can be regarded on the basis of the circuit being able to be simplified by using the degrees of freedom that arise as a result of particular input patterns not being able to arise as a result of the presorting of the input values.

A simplified full adder circuit, such as the mirror adder circuit 1400 or the mirror adder circuit 1500, can also be used for the full adders 606 when the input values of these full adders are also presorted. This is shown in FIG. 16.

Figure 16:
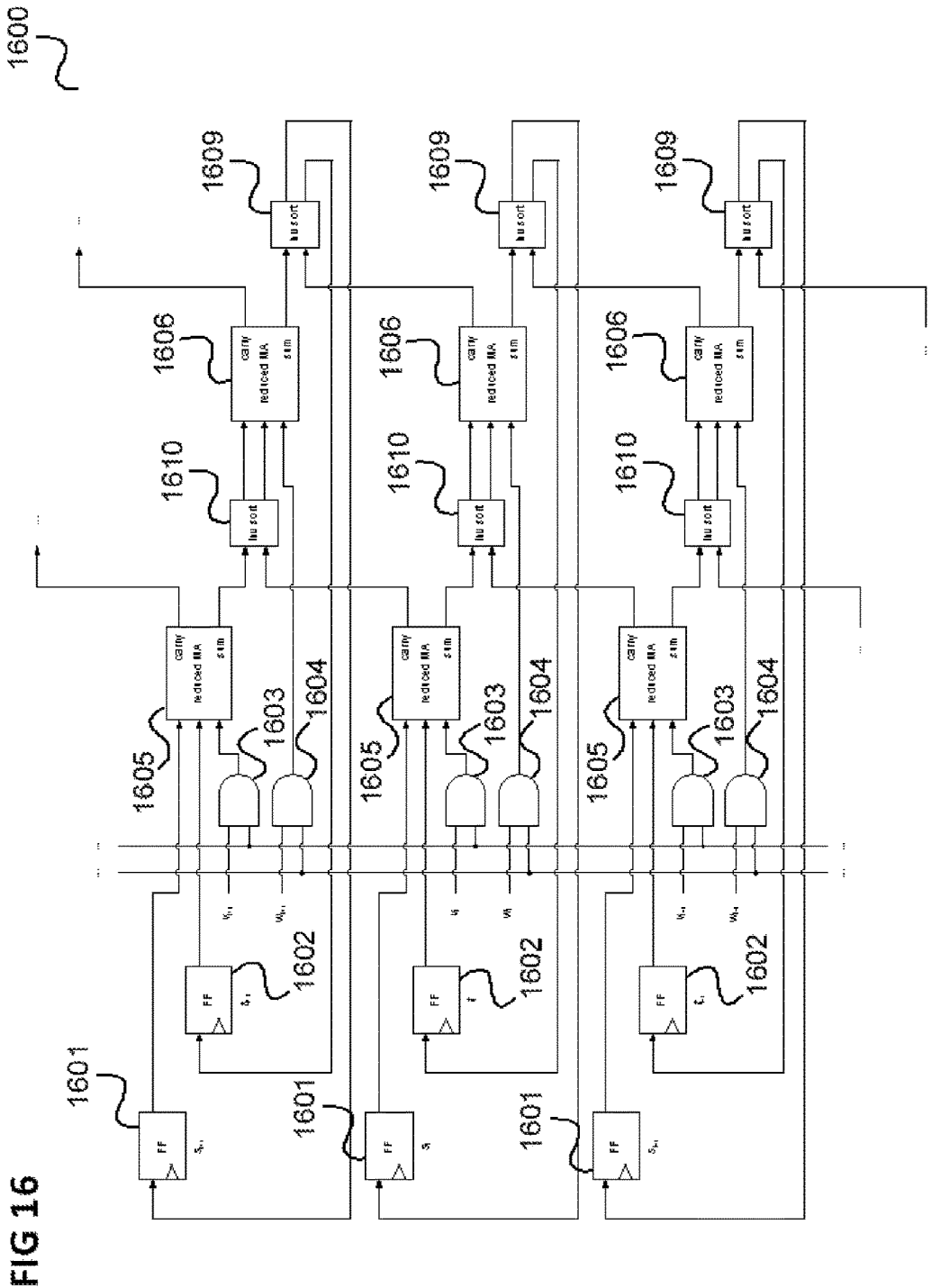
FIG. 16 shows an adder according to an embodiment.

FIG. 16 shows an adder 1600 according to an embodiment.

In a similar manner to the adder 600, the adder 1600 is used for adding numbers v and w to the current (accumulated) addition result in redundant representation (s, t), i.e. for the operation (s, t): =(s, t)+v+w, and, in a similar manner to the adder 600, has a first flipflop 1601, a second flipflop 1602, a first AND gate 1603, a second AND gate 1604, a first full adder 1605, a second full adder 1606 and a first sorter 1609 for each digit of the binary numbers s, t, v, w.

In contrast to the adder 600, the adder 1600 furthermore has a second sorter 1610 for each digit, said second sorter presorting two of its input values (for example the input values A and B when mirror adder circuit 1300 is used), in the example shown the sum bit that is output by the first full adder 1605 for the current digit and the carry bit that is output for the previous digit.

Hence, simplified (reduced) full adders, such as the reduced mirror adder circuit 1400 or the reduced mirror adder circuit 1500, can be used both for the first full adder 1605 and for the second full adder 1606.

When using a reduced mirror adder circuit 1400, 1500, the production of an adding stage consisting of a reduced mirror adder circuit and a downstream sorter for inverted signals requires the same number of transistor functions as for an adding stage that can process unsorted input values. Hence, the approach described for reducing a mirror adder circuit and the associated reduction in the average power draw can be used iteratively for multistage adders, as typically occur in arithmetic units for long numbers, and the saving effects can be utilized repeatedly.

Figure 17:
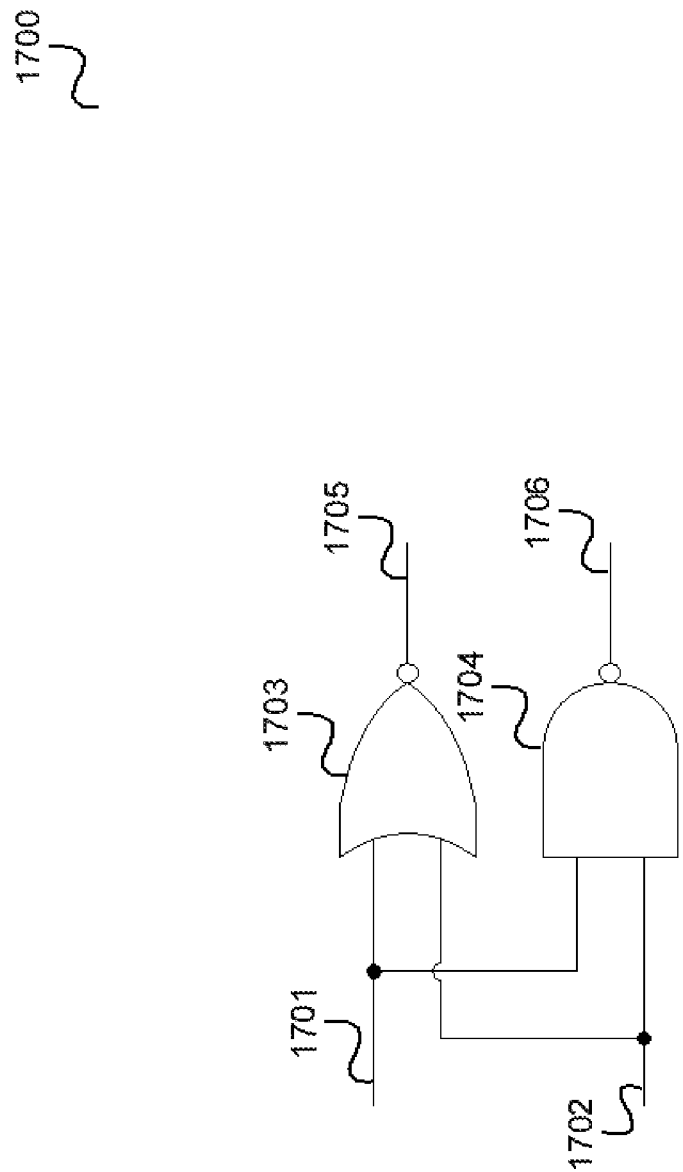
FIG. 17 shows a sorter for inverted signals.

FIG. 17 shows a sorter 1700 for inverted signals.

The sorter 1700 has a first input 1701 and a second input 1702, that are both connected to a NOR gate 1703 and a NAND gate 1704. The output of the NOR gate 1703 forms a first output 1705 of the sorter 1700 and the output of the NAND gate 1704 forms a second output 1706 of the sorter 1700.

In a further embodiment, the signals in an adder for long numbers are clocked after all the sorting stages. This avoids forwarding and multiplication of transient transitions in a logic of the adding stages, what are known as glitches, and additionally lowers the average power draw of the circuit. In the case of the adder 1600, such clocking can be achieved, by way of example, by isolating the two latch stages of the master/slave flipflops 1601, 1602 from one another. The master stage remains upstream of the first full adder 605, and the slave stage is inserted downstream of the second sorter 1610 upstream of the second full adder 606. This change can also be made without additional hardware complexity.

If two latch stages of the flipflops 1601, 1602, an AND gate for calculating a partial product, a reduced mirror adder and a sorter for inverted signals are respectively combined to form a new cell, then the most recently described variant can be represented as a regular network consisting of these new cells. A slice of such an adder consists of two such cells that are connected up cyclically. Signals for calculating the carry bits connect the slice to its respective neighbors.

Figure 18:
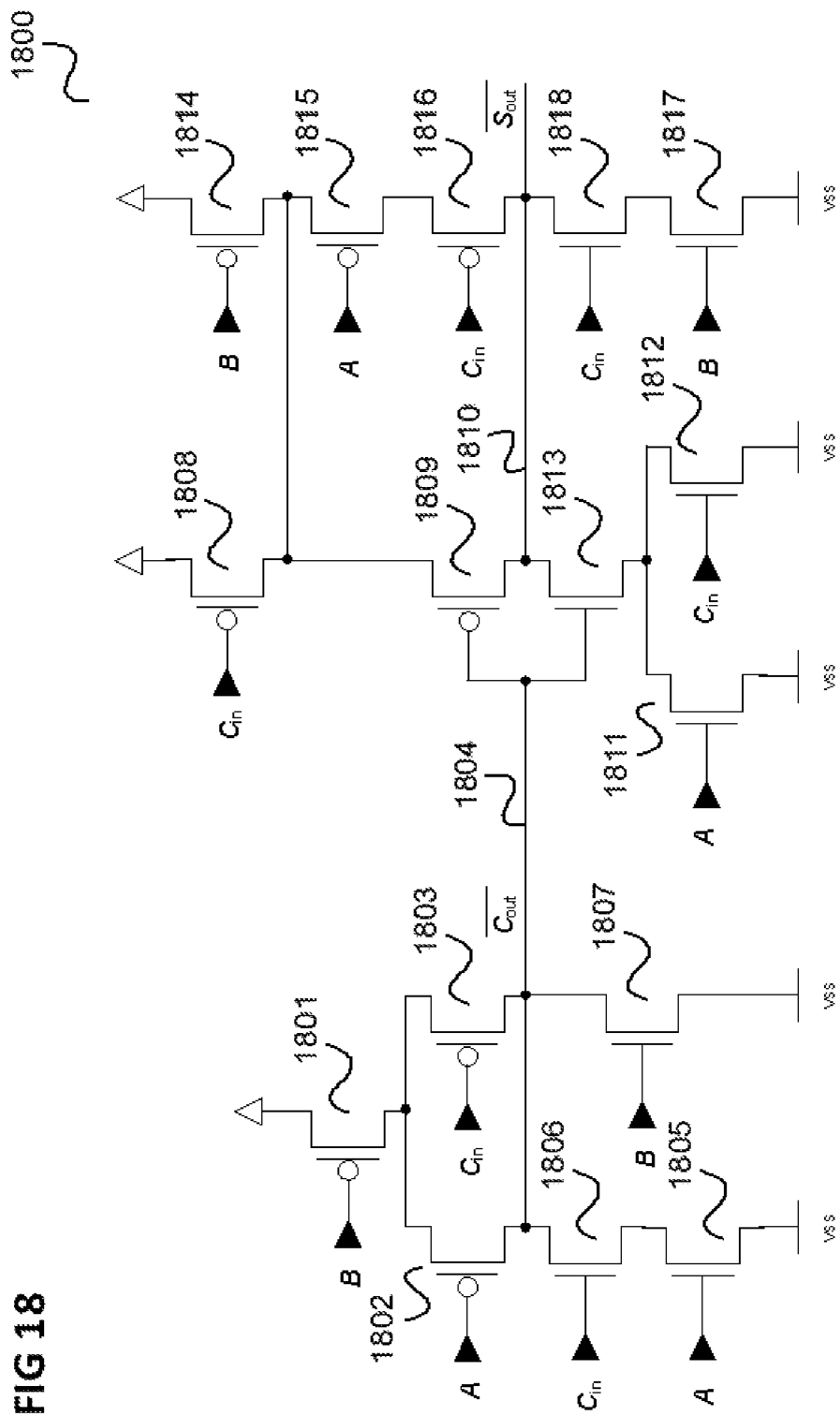
FIG. 18 shows a reduced circuit for a full adder in complementary CMOS design.

FIG. 18 shows a reduced circuit 1800 for a full adder in complementary CMOS design assuming that the condition A≥B is constantly met. The reduced circuit 1800 uses 16 instead of the 24 transistors for the original full adder circuit.

The circuit 1800 has a first p channel FET 1801 whose gate is supplied with the input value B and whose source is connected to the high supply potential and whose drain is connected to the sources of a second p channel FET 1802, whose gate is supplied with the input value A, and of a third p channel FET 1803, whose gate is supplied with the input value $C_{in}$. The drains of the second p channel FET 1802 and the third p channel FET 1803 are connected to a first node 1804 that assumes the level of the complementary carry bit $\overline{C_{out}}$.

Further, the circuit 1800 has a first n channel FET 1805 whose source is connected to the low supply potential, whose gate is supplied with the input value A and whose drain is connected to the source of a second n channel FET 1806 whose gate is supplied with the input value $C_{in}$ and whose drain is connected to the first node 1804.

The circuit 1800 further has a third n channel FET 1807 whose source is connected to the low supply potential and whose drain is connected to the first node 1804 and whose gate is supplied with the input value B.

The circuit 1800 further has a fourth p channel FET 1808 whose source is connected to the high supply potential and whose gate is supplied with the input value $C_{in}$. The drain of the fourth p channel FET 1808 is connected to the source of a fifth p channel FET 1809 whose gate is connected to the first node 1804 and whose drain is connected to a second node 1810 that assumes the level of the complementary sum bit $\overline{S_{out}}$.

The circuit 1800 further has a fourth n channel FET 1811 whose source is connected to the low supply potential and whose gate is supplied with the input value A. The circuit 1800 further has a fifth n channel FET 1812 whose source is connected to the low supply potential and whose gate is supplied with the input value $C_{in}$.

The drains of the fourth n channel FET 1811 and the fifth n channel FET 1812 are connected to the source of a sixth n channel FET 1813 whose gate is connected to the first node 1804 and whose drain is connected to the second node 1810.

The circuit 1800 further has a sixth p channel FET 1814 whose source is connected to the high supply potential, whose gate is supplied with the input value B and whose drain is connected to the source of a seventh p channel FET 1815 whose gate is supplied with the input value A and whose drain is connected to the source of an eighth p channel FET 1816 whose gate is supplied with the input value $C_{in}$, and whose drain is connected to the second node 1810.

The drain of the sixth p channel FET 1814 is furthermore connected to the drain of the fourth p channel FET 1808.

The circuit 1800 further has a seventh n channel FET 1817 whose source is connected to the low supply potential, whose gate is supplied with the input value B and whose drain is connected to the source of an eighth n channel FET 1818 whose gate is supplied with the input value $C_{in}$ and whose drain is connected to the second node 1810.

Figure 19:
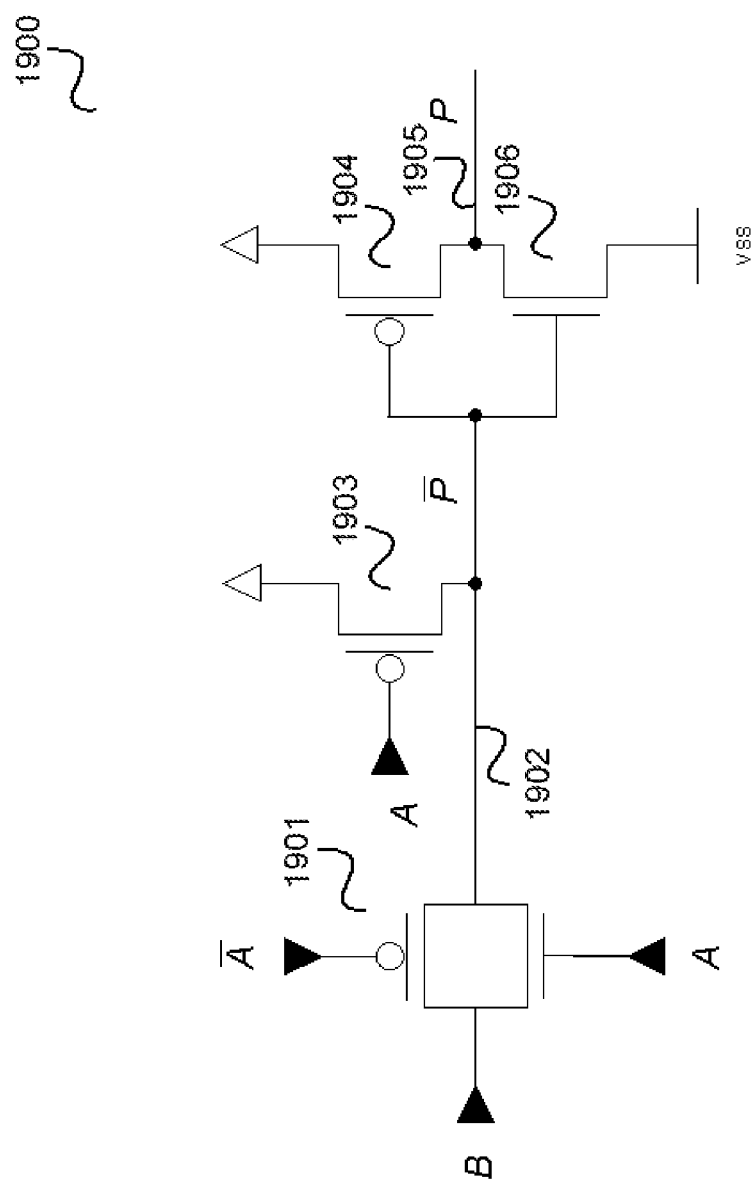
FIG. 19 shows a reduced circuit for calculating a propagate signal for an adder on a transmission gate basis.

FIG. 19 is a reduced circuit 1900 for calculating a propagate signal P (and the inverted signal) for an adder on a transmission gate basis. Assuming that the condition A≥B is constantly met, the circuit is reduced. The reduced circuit uses five instead of the originally eight transistors.

The circuit 1900 has a transmission gate 1901 that is supplied with the input value B as an input signal and that is controlled by the input value A and the complementary input value $\overline{A}$. The output of the transmission gate is connected to a first node 1902 which assumes the value of the complementary propagate signal P.

The circuit 1900 further has a first p channel FET 1903 whose source is connected to the high supply potential, whose gate is supplied with the input value A and whose drain is connected to the first node 1902.

The circuit 1900 further has a second p channel FET 1904 whose source is connected to the high supply potential, whose gate is connected to the first node 1902 and whose drain is connected to a second node 1905 which assumes the value of the propagate signal P.

The circuit 1900 further has an n channel FET 1906 whose source is connected to the low supply potential, whose gate is connected to the first node 1902 and whose drain is connected to the second node 1905.

Figure 20:
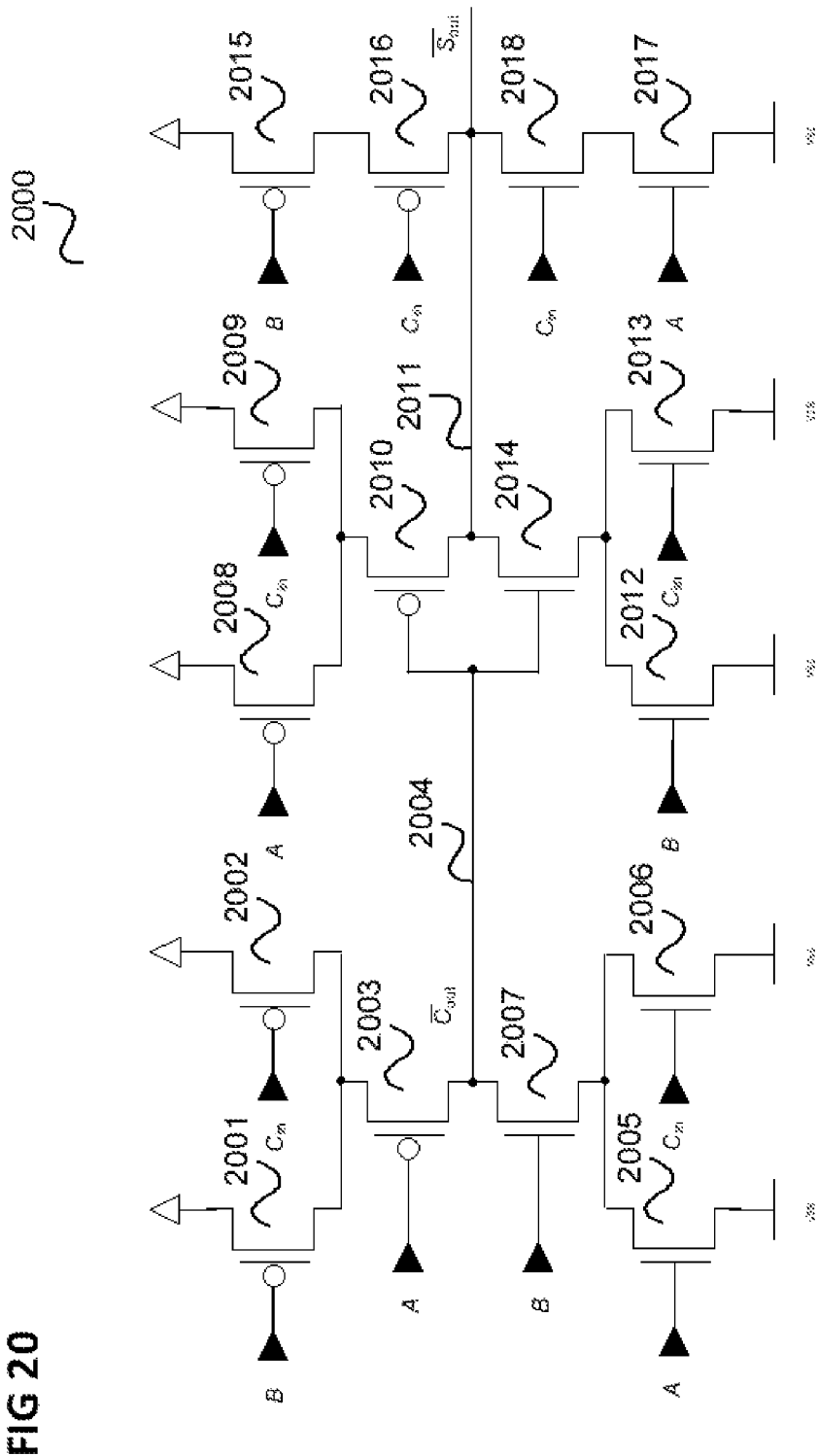
FIG. 20 shows a circuit for a full adder according to an embodiment.

FIG. 20 shows a circuit 2000 for a full adder, some of which circuit is switched to high impedance when A>B.

The circuit 2000 has a first p channel FET 2001 whose source is connected to the high supply potential and whose gate is supplied with the input value B. The circuit 2000 further has a second p channel FET 2002 whose source is connected to the high supply potential and whose gate is supplied with the input value $C_{in}$.

The drains of the first p channel FET 2001 and the second p channel FET 2002 are connected to the source of a third p channel FET 2003 whose gate is supplied with the input value A and whose drain is connected to a first node 2004 which assumes the level of the complementary carry bit $\overline{C_{out}}$.

The circuit 2000 further has a first n channel FET 2005 whose source is connected to the low supply potential and whose gate is supplied with the input value A. The circuit 2000 further has a second n channel FET 2006 whose source is connected to the low supply potential and whose gate is supplied with the input value $C_{in}$.

The drains of the first n channel FET 2005 and the second n channel FET 2006 are connected to the source of a third n channel FET 2007 whose gate is supplied with the input value B and whose drain is connected to the first node 2004.

Furthermore, the circuit 2000 has a fourth p channel FET 2008 whose source is connected to the high supply potential and whose gate is supplied with the input value A. The circuit 2000 further has a fifth p channel FET 2009 whose source is connected to the high supply potential and whose gate is supplied with the input value $C_{in}$.

The drains of the fourth p channel FET 2008 and the fifth p channel FET 2009 are connected to the source of a sixth p channel FET 2003 whose gate is connected to the first node 2004 and whose drain is connected to a second node 2011 which assumes the level of the complementary sum bit $\overline{S_{out}}$.

The circuit 2000 further has a fourth n channel FET 2012 whose source is connected to the low supply potential and whose gate is supplied with the input value B. The circuit 2000 further has a fifth n channel FET 2013 whose source is connected to the low supply potential and whose gate is supplied with the input value $C_{in}$.

The drains of the fourth n channel FET 2012 and the fifth n channel FET 2013 are connected to the source of a sixth n channel FET 2014 whose gate is connected to the first node 2004 and whose drain is connected to the second node 2011.

The circuit 2000 further has a seventh p channel FET 2015 whose source is connected to the high supply potential, whose gate is supplied with the input value B and whose drain is connected to the source of an eighth p channel FET 2016 whose gate is supplied with the input value $C_{in}$ and whose drain is connected to the second node 2011.

The circuit 2000 further has a seventh n channel FET 2017 whose source is connected to the low supply potential, whose gate is supplied with the input value A and whose drain is connected to the source of an eighth n channel FET 2018 whose gate is supplied with the input value $C_{in}$ and whose drain is connected to the second node 2011.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A chip comprising:
    a processing circuit, comprising:
        a first input path and a second input path;
        an adder circuit configured to receive a first input bit and a second input bit via the first input path and the second input path and configured to perform a logic operation which is commutative with respect to the first input bit and the second input bit; wherein the logic operation comprises an adding operation; and
        a sorter configured to distribute the first input bit and the second input bit to the first input path and the second input path according to a predetermined sorting rule;
        wherein the first input bit and the second input bit are bits for one digit of a redundant representation of a binary number.

2. The processing circuit of claim 1,
    wherein the predetermined sorting rule is to distribute a "1" to the first input path and a "0" to the second input path if the first input bit is different from the second input bit.

3. The processing circuit of claim 1,
    wherein the predetermined sorting rule is to distribute a "0" to the first input path and a "1" to the second input path if the first input bit is different from the second input bit.

4. The processing circuit of claim 1,
    wherein the logic operation includes an addition of the first input bit and the second input bit.

5. The processing circuit of claim 1,
    wherein the adder circuit is configured to receive the first input bit and the second input bit for an iteration of the logic operation and the first input bit and the second input bits are output bits from an earlier iteration of the logic operation.

6. The processing circuit of claim 1,
    wherein the adder circuit is configured to receive the first input bit and the second input bit for an application of the logic operation to a digit of the binary number and the first input bit is the result bit of an application of the logic operation to the same or a different digit of the binary number and the second input bit is the result bit of an application of the logic operation to the same or a different digit of the binary number.

7. The processing circuit of claim 1,
    wherein the first input bit or the second input bit is a carry bit of an addition applied to a different digit of the binary number.

8. The processing circuit of claim 1,
    wherein the logic operation includes an addition of the first input bit and the second input bit and a bit of another binary number.

9. The processing circuit of claim 1,
    wherein the first input bit and the second input bit are bits for one digit of a carry save representation of a binary number.

10. The processing circuit of claim 1,
    wherein the first input path includes a first memory element for storing the first input bit and the second input path includes a second memory element for storing the second input bit.

11. The processing circuit of claim 10,
    wherein the first memory element is a first flip-flop; and wherein the second memory element is a second flip-flop.

12. The processing circuit of claim 1,
    wherein the adder circuit is simplified on the basis of the first input bit and the second input bit being distributed to the first input path and the second input path according to the predetermined sorting rule.

13. The processing circuit of claim 12,
    wherein the adder circuit is simplified such that it carries out the logic operation erroneously when the first input bit and the second input bit are not distributed to the first input path and the second input path according to the predetermined sorting rule.

14. The processing circuit of claim 1,
    wherein the adder circuit is set up to carry out the logic operation according to a truth table that, allowing for the first input bit and the second input bit being distributed to the first input path and the second input path according to the predetermined sorting rule, is simplified such that the adder circuit can carry out the logic operation erroneously when the first input bit and the second input bit are not distributed to the first input path and the second input path according to the predetermined sorting rule.

15. The processing circuit of claim 1,
wherein the processing circuit is a reduced full adder circuit.

16. The processing circuit of claim 12,
wherein the processing circuit is a reduced mirror adder circuit.

17. A method for operating a chip comprising a processing circuit, the method comprising:
distributing a first input bit and a second input bit according to a predetermined sorting rule to a first input path and a second input path to a adder circuit for receiving the first input bit and the second input bit via the first input path and the second input path and for performing a logic operation which is commutative with respect to the first input bit and the second input bit; wherein the logic operation comprises an adding operation.

18. A processing circuit, comprising:
a first input path and a second input path;
a mirror adder circuit configured to receive a first input bit and a second input bit via the first input path and the second input path and configured to perform a logic operation which is commutative with respect to the first input bit and the second input bit; wherein the logic operation comprises an adding operation; and
a sorter configured to distribute the first input bit and the second input bit to the first input path and the second input path according to a predetermined sorting rule; wherein the sorter is configured to receive the first input bit and the second input bit and to supply the first input bit and the second input bit to the first input path and the second input path according to the predetermined sorting rule.

* * * * *